United States Patent [19]
Ueno

[11] Patent Number: 5,995,545
[45] Date of Patent: Nov. 30, 1999

[54] SIGNAL REPRODUCING METHOD AND APPARATUS

[75] Inventor: Hiroaki Ueno, Kawasaki, Japan

[73] Assignee: Fujitsu Limited, Kawasaki, Japan

[21] Appl. No.: 08/801,349

[22] Filed: Feb. 19, 1997

[30] Foreign Application Priority Data

Mar. 11, 1996 [JP] Japan .................................... 8-053327

[51] Int. Cl.⁶ .......................... H03K 5/159; H04L 27/06; G06F 11/10
[52] U.S. Cl. .......................... 375/233; 375/341; 371/43.6
[58] Field of Search .................................... 375/254, 233, 375/285, 341, 229, 262; 371/43.1, 43.4, 43.6, 43.7; 360/65

[56] References Cited

U.S. PATENT DOCUMENTS

| | | | |
|---|---|---|---|
| 5,003,555 | 3/1991 | Bergmans | 375/233 |
| 5,050,186 | 9/1991 | Gurcan et al. | 375/233 |
| 5,052,000 | 9/1991 | Wang et al. | 375/233 |
| 5,136,593 | 8/1992 | Moon et al. | 371/43.8 |
| 5,550,810 | 8/1996 | Monogioudis et al. | 375/348 |
| 5,561,687 | 10/1996 | Turner | 375/233 |

FOREIGN PATENT DOCUMENTS

| | | |
|---|---|---|
| 61-285831 | 12/1986 | Japan . |
| 63-316934 | 12/1988 | Japan . |
| 63-316935 | 12/1988 | Japan . |
| 1-212931 | 8/1989 | Japan . |
| 4-503278 | 6/1992 | Japan . |
| 7-38470 | 2/1995 | Japan . |
| 7-177124 | 7/1995 | Japan . |

*Primary Examiner*—Stephen Chin
*Assistant Examiner*—Albert Park
*Attorney, Agent, or Firm*—Greer, Burns & Crain, Ltd.

[57] ABSTRACT

The present invention relates to a signal reproducing method and a signal reproducing apparatus for reproducing a signal recorded by a high-density recording. The invention avoids deteriorating the performance of an ML detector while suppressing the equalization loss and the correlation noise. The signal reproducing method includes steps of generating a first signal using a first selected number of convolutions, generating a second signal using a second selected number of convolutions, and combining the first and second signals to identify the information in the input signal. The first and second signals can be processed by adding or subtracting the first and second signals, depending on the circuit configuration. With this invention, the number of convolution steps is reduced, and it is possible to reduce equalization loss and correlation noise using circuits having a small circuit scale. When applied to a disk drive, it is possible to improve reliability, reduce circuit scale and reduce the size and weight of the drive. It is also possible to obtain a high-density recording due to the reduced error rate realized by this invention.

27 Claims, 18 Drawing Sheets

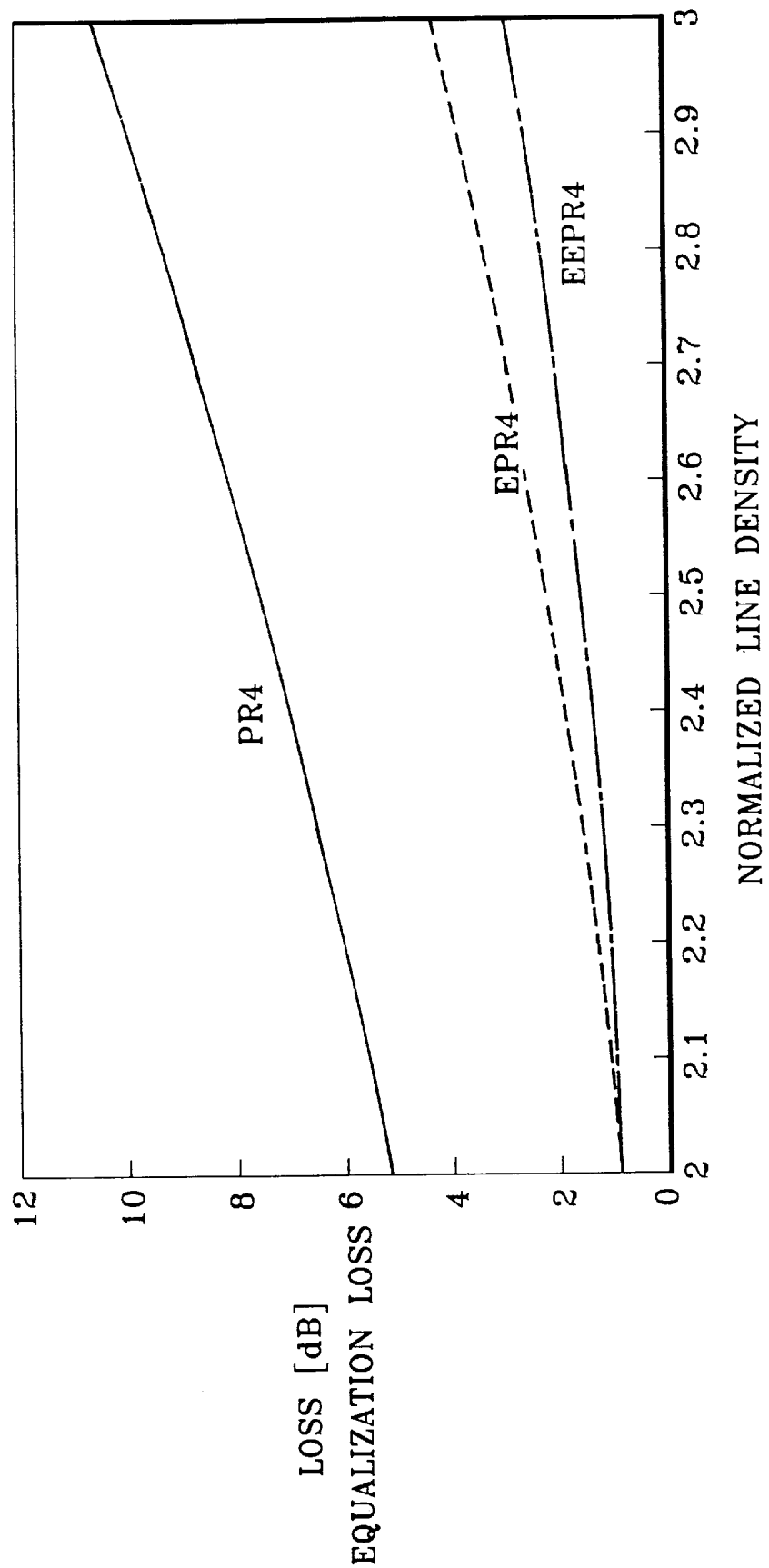

SIGNAL REPRODUCING METHOD AND APPARATUS

BACKGROUND OF THE INVENTION

The present invention relates to signal reproducing methods and signal reproducing apparatuses, and more particularly to a method and apparatus for reproducing a signal which is recorded with a high recording density.

Due to the rapid information transfer capabilities and large storage capacity of recent magnetic recording and reproducing devices, there is a demand to improve the recording density of magnetic recording and reproducing apparatuses. Various systems using waveform interference have been proposed to improve the recording density.

In prior art magnetic recording and reproducing apparatus, a waveform interference technique called Partial Response Maximum Likelihood (PRML) technique is employed to improve recording density. The PRML technique is a signal processing technique for realizing a high-density recording on magnetic disk and optical disk, and combines the Partial Response (PR) technique and the Maximum Likelihood (ML) technique.

FIG. 8 is a diagram showing the general construction of a magnetic disk unit 61. The magnetic disk unit 61 includes a magnetic disk 62 that is rotated by a spindle motor 63, and a magnetic head 64 which faces the magnetic disk 62. A recording signal is recorded on the magnetic disk 62 by generating a magnetic field dependent on the recording signal of the magnetic head 64. The recording signal recorded on the magnetic disk 62 is later reproduced by the magnetic head 64, which detects changes in the recorded magnetic poles.

The magnetic head 64 is connected to a voice coil motor (which is not shown) via an arm 65, and is moved in a radial direction on the magnetic disk 62, as indicated by arrow A. Signals are recorded on tracks of the magnetic disk 62, and the tracks are formed about a rotation center of the magnetic disk 62.

The magnetic head 64 is coupled to a recording system 66, which processes the recording signal, and a reproducing system 67, which reproduces a head reproduced signal that is reproduced by the magnetic head 64. The recording system 66 includes an encoder 68 which encodes the recording signal received from an input terminal $T_{IN}$, and a recording equalizer 69, which equalizes the encoded recording signal from the encoder 68 so that a high-density recording is possible. The output signal of the recording equalizer 69 is supplied to the magnetic head 64.

The reproducing system 67 includes a reproducing equalizer 70, an ML detector 71, and decoder 72. The equalizer 70 receives the high-density head reproduced signal from the magnetic head 64, which converts the magnetic information into electrical information. The equalizer 70 equalizes the head reproduced signal using waveform interference. The ML detector 71 reproduces an output signal from the equalizer 70 into the original signal using waveform interference. The decoder 72 reproduces the recording signal from the output signal of the ML detector 71, and outputs the recording signal through an output terminal $T_{OUT}$.

The magnetic disk unit 61 performs signal processing using waveform interference for high-density recording through the use of the recording equalizer 69, the reproducing equalizer 70, the ML detector 71 and the other components discussed. Techniques that have been proposed for carrying out such signal processing are the PR technique and a Fixed Delay Tree Search with Decision Feedback (FDTS/DF) technique.

When attempts are made to further improve the high-density recording by using the PR technique, the FDTS technique and the like, it becomes essential to reduce the equalization loss and the correlation noise in the reproducing equalizer 70, the ML detector 71 and the other components found in the reproducing system 67.

FIG. 9 is a block diagram showing the construction of a reproducing system employing the PRML technique. As shown in FIG. 9, the head reproduced signal is received through an input terminal IN and is supplied to a feedforward filter 81, which corresponds to the reproducing equalizer 70 shown in FIG. 8. The feedforward filter 81 carries out a wave-shaping process with respect to the head reproduced signal so that the level of the head reproduced signal will not affect the preceding signal. The feedforward filter 81 also equalizes the target waveform by controlling the waveform interference constant to the subsequent signal. The signal which is equalized to the target waveform by the feedforward filter 81 is supplied to an ML detector 82, which corresponds to the ML detector 71 shown in FIG. 8. The ML detector 82 detects the most likely sequence of the signal from the feedforward filter 81 having the target waveform and makes a correlation from the waveform interference. An output signal of this ML detector 82 is output through an output terminal OUT.

In the reproducing system employing the PRML technique, the equalization loss in the feedforward filter increases as the line density increases. In order to reduce this equalization loss, an impulse response such as PR4, EPR4 or EEPR4 is used in the feedforward filter 81.

FIG. 10 shows impulse response characteristics of the various impulse responses. FIG. 10 (A) shows the impulse response characteristic of the PR4, and FIG. 10 (B) shows the impulse response of the EPR4, and FIG. 10(C) shows the impulse response of the EEPR4.

The PR4 is sometimes also referred to as PR (1, 0, -1), and has the impulse response shown in FIG. 10 (A). This impulse response is realized by giving to the reproduced signal a characteristic (1-D) (1+D), where D denotes a 1-bit delay.

The EPR4 is sometimes also referred to as PR (1, 1, -1, -1), and has the impulse response shown in FIG. 10 (B). This impulse response is realized by giving to the reproduced signal a characteristic $(1-D)(1+D)^2$, where D denotes a 1-bit delay.

The EEPR4 is sometimes also referred to as PR (1, 2, -2, -1), and has the impulse response shown in FIG. 10 (C). This impulse response is realized by giving to the reproduced signal a characteristic $(1-D)(1+D)^3$, where D denotes a 1-bit delay.

However, even when the impulse responses such as the PR4, EPR4 or EEPR4 are used, while it is possible to reduce the increase of the equalization loss, the equalization loss caused by the increase of the line density still cannot be prevented.

FIG. 11 shows the equalization loss with respect to a normalized line density of the recording signal for the PR4, EPR4 and EEPR4. In FIG. 11, the equalization loss of the PR4 is indicated by a solid line, the equalization loss of the EPR4 is indicated by a dotted line, and the equalization loss of the EEPR4 is indicated by a one-dot chain line.

As shown in FIG. 11, the equalization loss of the EPR4 is smaller than that of the PR4, and the equalization loss the EEPR4 is smaller than that of the EPR4. However, the equalization loss increases as the line density increases, for each of the PR4, EPR4 and EEPR4.

FIG. 12 shows equalization gains with respect to the normalized frequency for the PR4, EPR4 and EEPR4. In FIG. 12, the equalization gain of the PR4 is indicated by a solid line, the equalization gain of the EPR4 is indicated by a dotted line, and the equalization gain of the EEPR4 is indicated by a one-dot chain line.

As shown in FIG. 12, the noise increases because the equalization gain greatly changes depending on the normalized frequency. For this reason, the correlation noise at the ML detector 82 cannot be neglected.

FIG. 13 shows signal-to-noise (S/N) ratios with respect to the normalized line density for the PR4, EPR4 and EEPR4. In FIG. 13, the S/N ratio of the PR4 is indicated by a solid line, the S/N ratio of the EPR4 is indicated by a dotted line, and the S/N ratio of the EEPR4 is indicated by a one-dot chain line. As shown in FIG. 13, the S/N ratio becomes smaller as the line density increases, and the effects of the S/N ratio are more notable as the line density increases.

The convolution steps increase in the EPR4 as compared to the PR4, and the convolution steps increase in the EEPR4 as compared to the EPR4. As the convolution steps increase, it is possible to reduce the noise at the ML detector 82.

FIG. 14 shows S/N ratios at a portion of the ML detector 82 with respect to the normalized line density for the PR4, EPR4 and EEPR4. In FIG. 14, the S/N ratio of the PR4 is indicated by a solid line, the S/N ratio of the EPR4 is indicated by a dotted line, and the S/N ratio of the EEPR4 is indicated by a one-dot chain line. As shown in FIG. 14, the S/N ratio of the ML detector 82 is larger for the EPR4 and the EEPR4 than for the PR4.

FIG. 15 shows peak signal/root mean square (RMS) noise with respect to the normalized line density for the PR4, EPR4 and EEPR4. In FIG. 15, the peak signal/RMS noise of the PR4 is indicated by a solid line, the peak signal/RMS noise of the EPR4 is indicated by a dotted line, and the peak signal/RMS noise of the EEPR4 is indicated by a one-dot chain line.

As shown in FIG. 15, the noise is reduced more for the EPR4 than for the PR4, where the EPR4 has more convolution steps compared to the PR4. The noise is reduced more for the EEPR4 than for the EPR4, where the EEPR4 has more convolution steps compared to the EPR4. Accordingly, the noise can further be reduced by increasing the convolution steps, but when the convolution steps are increased, the number of registers required in the ML detector 82 also increases.

When determining the number of registers required, the number of convolution steps may be denoted by T, paths 0 and 1 are provided for each step, and by taking into consideration the combination of such paths, it becomes necessary to provide $2^{(T+1)}$ paths. The number of registers required in 1 path is normally $5 \cdot (T+1)$, $\cdot 2^{(T+1)}$ and thus the number R of registers required for the paths can be described by the following formula (1).

$$R = 5 \cdot (T+1) \cdot 2^{(T+1)} \quad (1)$$

For PR4, the number T of convolution steps is "1". Thus, from the formula (1) above, the number R of registers required for the PR4 becomes:

$$R = 5 \cdot (1+1) \cdot 2^{1+1} = 5 \cdot 2 \cdot 2^2 = 40.$$

According to the EPR4, the number T of convolution steps is "2", and from the formula (1) the number R of registers required from the EPR4 becomes 120. According to the EEPR4, the number T of convolution steps is "3", and from the formula (1), the number R of registers required for the EEPR4 becomes 320. In other words, the number R of registers that are required increases exponentially as the number T of convolution steps increase.

Therefore, when using the PR technique, the number of convolution steps becomes small if a small circuit scale is used, thereby increasing the noise and more easily generating errors. On the other hand, the circuit scale will become extremely large if the noise is to be reduced.

The FDTS/DF technique has been proposed to eliminate the above problems of the PR technique (the increased equalization loss, the increased correlation noise and the considerably increased circuit scale).

FIG. 16 is a block diagram showing construction of the reproducing system employing the FDTS/DF technique.

The head reproduced signal is supplied to a feedforward filter 91 from an input terminal IN. The feedforward filter 91 carries out a wave-shaping process with respect to the head reproduced signal so that the level of the head reproduced signal will not affect the preceding signal. The feedforward filter 91 also equalizes the target waveform by controlling the waveform interference to the subsequent signal to be constant. The signal which is equalized to the target waveform by the feedforward filter 91 is supplied to a subtracter 92.

The subtracter 92 subtracts an output signal which is output from an output terminal OUT and is received via a feedback filter 93 from the signal received from the feedforward filter 91. An output signal of the subtracter 92 is supplied to a FDTS processor 94.

The feedback filter 93 multiplies a waveform interference coefficient by the output signal that is output via the output terminal OUT. The feedback filter 93 also obtains a waveform interference quantity of the preceding signal and the waveform interference quantity of the subsequent signal. The output signal of this feedback filter 93 is supplied to the subtracter 92.

The FDTS processor 94 obtains a mean-square error between an anticipated value under a noise-free condition and the signal which is output from the subtracter 92, and outputs a most likely path out of the possible paths which are arranged in a tree format. The output signal of the FDTS processor 94 is output via the output terminal OUT and is also supplied to the feedback filter 93.

FIG. 17 shows an equalization loss versus normalized frequency characteristic of the FDTS/DF feedforward filter. More particularly, FIG. 17 shows the equalization loss with respect to the normalized frequency for a case where an impulse response Y(D) of the feedforward filter 91 is set to $Y(D) = 1 + D + (1/2)D^2 + (1/4)D^3 \ldots$ and a normalized line density K of an input signal is set to 3.0, 2.5 and 2.0. In FIG. 17, the smaller the normalized line density, the smaller the equalization loss. In addition, the equalization loss can be set below 2 dB to a relatively low value at the normalized line density of 2.0, as shown in FIG. 17.

FIG. 18 shows another equalization loss versus normalized frequency characteristic of the FDTS/DF feedforward filter. More particularly, FIG. 18 shows the equalization loss with respect to the normalized frequency for a case where the impulse response Y(D) of the feedforward filter 91 is set to $Y(D) = 1 + 1.5D + D^2 + 0.5D^3 + (1/4)D^4 \ldots$ and the normalized line density K of the input signal is set to 3.0, 2.5 and 2.0. In FIG. 18, the smaller the normalized line density, the smaller the equalization loss. In addition, the equalization loss can be set below 2 dB to a relatively low value at the normalized line density of 2.0, as shown in FIG. 18.

Accordingly, the equalization loss of the feedforward filter 91 can be set relatively small as shown in FIGS. 17 and 18 by the FDTS/DF, and the equalization loss is small compared to that obtained by the PR4, EPR4 and EEPR4 described in conjunction with FIG. 12.

FIG. 19 shows an equalization loss versus frequency characteristic for the PR4, EPR4, EEPR4 and FDTS/DF. As may be seen from FIG. 19, a characteristic FDTS1 which is obtained by the FDTS/DF using the feedforward filter having the characteristic shown in FIG. 17 has a small equalization loss for all normalized line densities as compared to that obtained using the PR4. In addition, a characteristic FDTS2 which is obtained by the FDTS/DF using the feedforward filter having the characteristic shown in FIG. 18 has a small equalization loss for all normalized line densities as compared to that obtained using any of the PR4, EPR4 and EEPR4, thereby making it possible to reduce the correlation noise compared to the PR4, EPR4 and EEPR4.

According to the conventional reproducing system employing the PR technique, the number of convolution steps is reduced if the circuit is realized on a small circuit scale. However, the use of a small circuit scale also increases the noise and errors are generated more easily. On the other hand, to reduce the noise, the circuit must be realized on an extremely large circuit scale. In this latter case, it would require further size reduction of mechanical parts in order to secure a sufficiently large mounting space for the large scale circuits, but there is a limit to size reduction for the mechanical parts. Accordingly, a rather large mounting space is still required.

In addition, if the path length is short, it is possible to reduce the equalization loss and the correlation noise. However, the short path length will deteriorate the performance of the ML detector, and then the error propagation becomes large.

The object of the present invention is to provide a signal reproducing method and a signal reproducing apparatus which can suppress the equalization loss and the correlation noise, but will not deteriorate the performance of the ML detector.

SUMMARY OF THE INVENTION

An input signal containing information is reproduced by generating a first signal using a first selected number of convolutions, generating a second signal using a second selected number of convolutions, and combining the first and second signals to identify the information in the input signal. The first and second signals can be processed by adding or subtracting them, depending on the circuit configuration, and using partial response maximum likelihood techniques to identify the signal information. With this invention, the number of convolution steps is reduced, and it is possible to reduce equalization loss and correlation noise using circuits having a small circuit scale. When applied to a disk drive, it is possible to improve reliability, reduce circuit scale and reduce the size and weight of the drive. It is also possible to obtain a high-density recording due to the reduced error rate realized by this invention.

BRIEF DESCRIPTION OF THE DRAWINGS

FIG. 11 is a diagram showing equalization losses with respect to normalized line density of recording information for the PR4, EPR4 and EEPR4.

DETAILED DESCRIPTION OF THE PREFERRED EMBODIMENTS

Embodiments of the present invention will be described with reference to the drawings.

Figure 1:
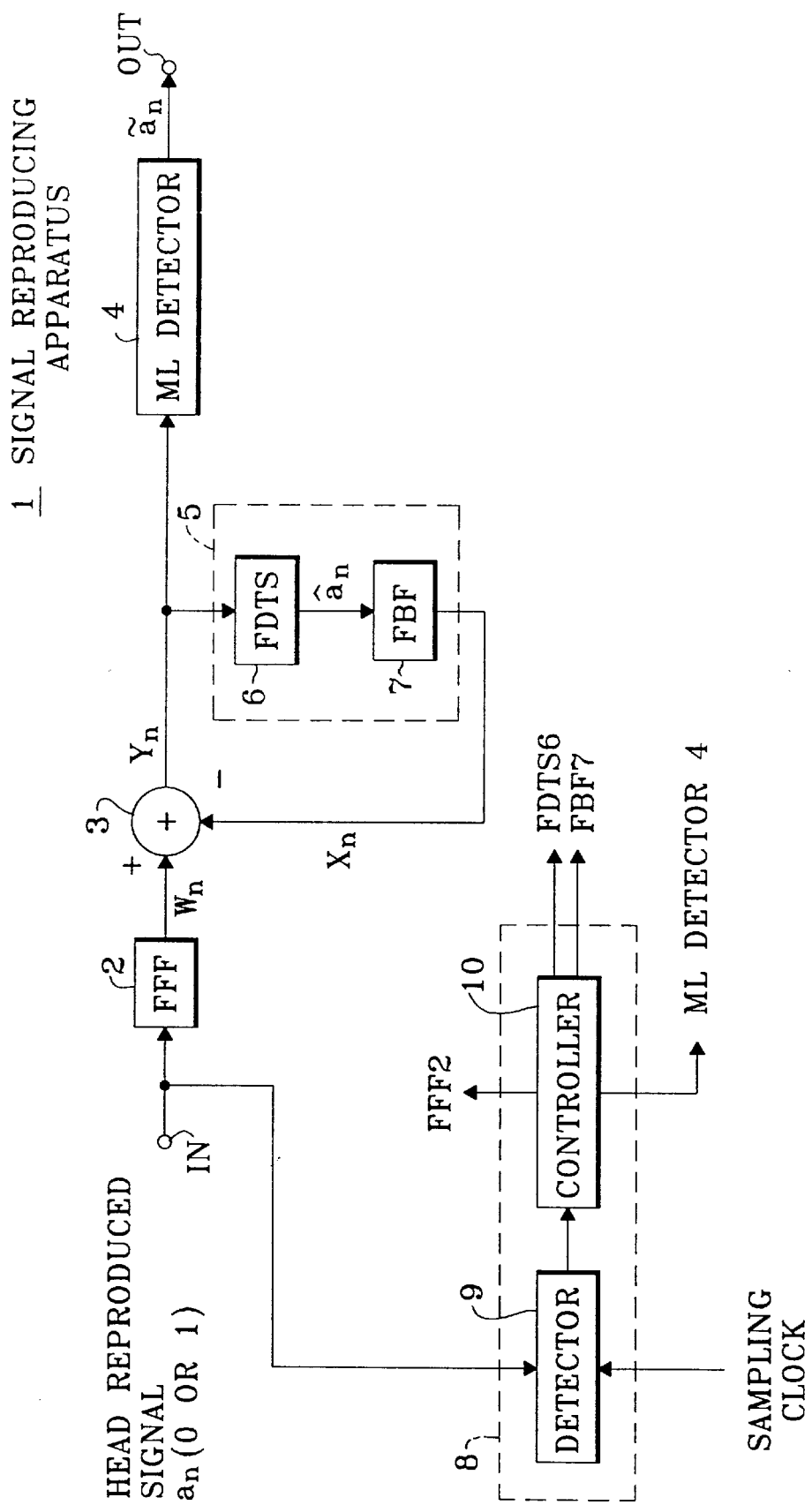
FIG. 1 is a block diagram showing the construction of a first embodiment of a signal reproducing apparatus according to the present invention.

FIG. 1 is a block diagram showing the construction of a first embodiment of a signal reproducing apparatus according to the present invention. The signal reproducing apparatus 1 corresponds to a reproducing system of a hard disk unit, which reproducing system includes a reproducing equalizer and an ML detector. The signal reproducing apparatus 1 of this embodiment includes a feedforward filter FFF2, a subtracter 3, an ML detector 4, a provisional detector 5, and a control circuit 8. The provisional detector 5 includes a Fixed Delay Tree Search (FDTS) processor and a Feed Back Filter (FBF) 7, and the control circuit 8 includes a detector 9 and a controller 10.

A head reproduced signal from a head is supplied to an input terminal IN and is supplied to the feedforward filter 2. The feedforward filter 2 carries out a wave-shaping process with respect to the head reproduced signal so that the level of the head reproduced signal will not affect the preceding signal. The feedforward filter 2 also carries out an equalization of the target waveform by controlling the waveform interference to the subsequent signal constant.

A response at the feedforward filter 2 can be described by the following formula (2), where $a_n$ denotes the head reproduced signal, $W_n$ denotes an output signal of the feedforward filter 2, and $g_t$ denotes a weighting with respect to the impulse response.

$$W_n = \sum_{t=0}^{T} a_{n-t} \cdot g_t \quad (2)$$

For example, in the case of the PR4 where the impulse response includes the element (1+D); $g_0=1$ and $g_1=1$. In the case of the EPR4 where the impulse response includes the element $(1+D)^2$; $g_0=1$, $g_1=2$ and $g_3=1$.

The output signal $W_n$ which is equalized to the target waveform in the feedforward filter 2 is supplied to the subtracter 3. The subtracter 3 subtracts an output signal $X_n$ of the provisional detector 5 from the output signal $W_n$ of the feedforward filter 2, and outputs a subtraction result $Y_n$.

The subtraction result $Y_n$ from the subtracter 3 is supplied to the ML detector 4 and the provisional detector 5. The ML detector 4 carries out the convolution in τ bits, and outputs a signal $\hat{a}_n$. The ML detector 4 is connected to an output terminal OUT, and the signal $\hat{a}_n$ detected by the ML detector 4 is output via the output terminal OUT and supplied to a decoder.

The FDTS processor 6 detects the subtraction result $Y_n$ output from the subtracter 3, and the feedback filter 7 carries out a weighting with respect to a provisional judgment result $\hat{a}_n$ which is output from the FDTS processor 6.

The FDTS processor 6 obtains a mean-square error between an anticipated value under a noise-free condition and the subtraction result $Y_n$ which is output from the subtracter 3, and outputs a most likely path out of the possible paths which are arranged in a tree format. This most likely path is output as the provisional judgment result $\hat{a}_n$ and is supplied to the feedback filter 7. The output signal of the feedback filter 7 is denoted by $X_n$, and the response of the feedback filter 7 with respect to the provisional judgment result $\hat{a}_n$ of the FDTS processor 6 can be described by the following formula (3), where $\hat{a}_{n-u}$ denotes the provisional judgment result from the FDTS processor 6, $g_u$ denotes the weighting coefficient, and t denotes the convolution length (t<T) of the subtraction result $Y_n$ which is input to the ML detector 4.

$$X_n = \sum_{u=t+1}^{T} \hat{a}_{n-u} \cdot g_u \quad (3)$$

The output signal $X_n$ of the feedback filter 7 is supplied to the subtracter 3, and is subtracted from the output signal $W_n$ of the feedforward filter 2 as described above.

A description will now be given of the response of the subtracter 3. The subtraction result $Y_n$ from the subtracter 3 is obtained by subtracting the output signal $X_n$ of the feedback filter 7 from the output signal $W_n$ of the feedforward filter 2, and can be described by the following formula (4).

$$Y_n = W_n - X_n \quad (4)$$

By substituting the formula (2) into the formula (4) for the output signal $W_n$ of the feedforward filter 2, and substituting the formula (3) into the formula (4) for the output signal $X_n$ of the feedback filter 7, the subtraction result $Y_n$ from the subtracter 3 can be described by the following formula (5).

$$Y_n = W_n - X_n = \sum_{t=0}^{T} a_{n-t} \cdot g_t - \sum_{u=t=1}^{T} \hat{a}_{n-u} \cdot g_u = \quad (5)$$

$$\sum_{t=0}^{t} a_{n-t} \cdot g_t - \sum_{u=t=1}^{T} (a_{n-u} \cdot g_u - \hat{a}_{n-u} \cdot g_u)$$

If it is assumed that the provisional judgment result $\hat{a}_n$ from the FDTS processor 6 is correct, the formula (5) can be rewritten as the following formula (6).

$$Y_n = \sum_{t=0}^{t} a_{n-t} \cdot g_t \quad (6)$$

The detector 9 in the control circuit 8 compares the head reproduced signal with a sampling clock, and detects a ratio of the frequency of the head reproduced signal and the sampling clock frequency. The controller 10 varies weighting coefficients g of the FDTS processor 6, the ML detector 4, the feedback filter 7 and the feedforward filter 2 to optimum values with respect to the frequency of the head reproduced signal, depending on the ratio detected by the detector 9.

The optimum processing available for a head reproduced signal with a highly accurate detection is achieved by varying the weighting coefficients g of the FDTS processor 6, the ML detector 4, the feedback filter 7 and the feedforward filter 2 to optimum values with respect to the frequency of the head reproduced signal by the control circuit 8.

According to this embodiment, the output signal $W_n$ of the feedforward filter 2 is subjected to the FDTS/DF processing by the provisional detector 5, which is made up of the FDTS processor 6 and the feedback filter 7. As a result, the equalization loss and the correlation noise are suppressed in the subtraction result $Y_n$ output from the subtracter 3. By suppressing this subtraction result $Y_n$ from the ML detection in the ML detector 4, it is possible to reduce the error of the output signal $\hat{a}_n$, because the equalization loss and the correlation loss are suppressed beforehand.

For example, if the convolution bit length T of the feedforward filter 2 is "4", the provisional detector 5 eliminates the waveform interference of 2 bits, and the convolution bit length τ of the ML detector 4 is "2", then the ML detector 4 can carry out the detection using the EPR4. In this case, the number of registers that are required in the ML detector 4 can be found to be 120 from the formula (1) described above. But if the provisional detector 5 were not provided, a convolution bit length T of the ML detector 4 will be "4", and in this case, the number of registers that are required in the ML detector 4 will be 800 from the formula (1). For this reason, it may be seen that this embodiment can reduce the circuit scale and also reduce the equalization loss and the correlation noise. Accordingly, this embodiment can obtain a highly accurate reproduced signal. When this embodiment is applied to a disk unit, for example, it is possible to improve the reliability, reduce the circuit scale, and reduce the size and weight of the disk unit. In addition, it is possible to obtain a high-density recording due to the reduced error rate realized by this embodiment.

Also, with this first embodiment, it is possible to simplify the ML detection process because the ML detection is carried out with respect to the second waveform-interference waveform which is reduced to τ bits from the T-bit first waveform-interference waveform. In addition, since the τ-bit second waveform-interference waveform is generated by subtracting the (T−τ)-bit third waveform-interference waveform from the T-bit first waveform interference waveform, the ML detection is carried out with respect to the signal which is suppressed of the noise and loss beforehand. As a result, the quantization loss and the correlation noise can be suppressed at the time of the ML detection.

Further, the provisional detection can be made using the existing FDTS and the existing Decision Feedback Equalization (DFE). This feature also makes it possible to obtain a highly accurate reproduced signal. Also, when applied to a disk drive, the benefits discussed above are also achieved.

Figure 2:
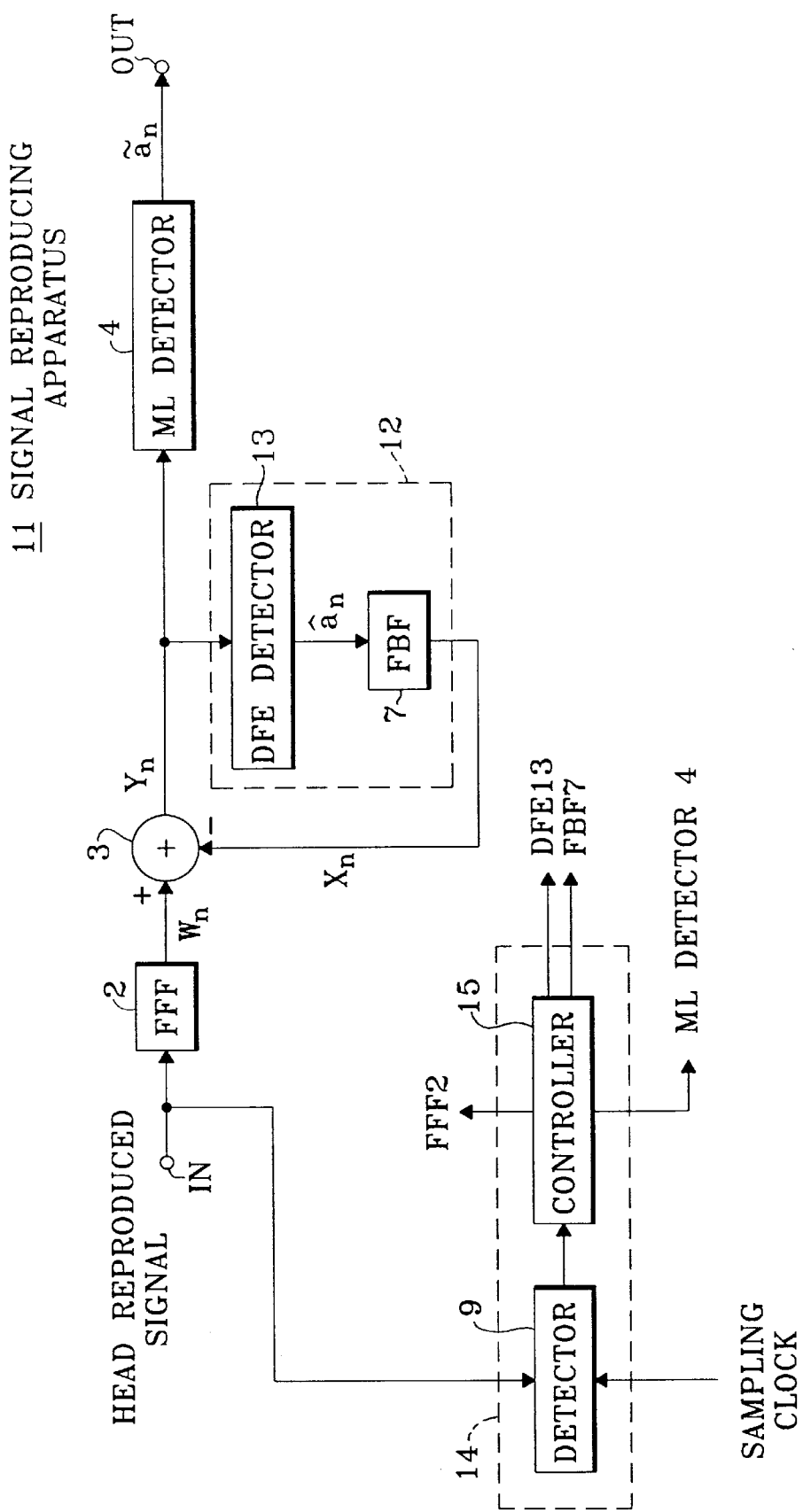
FIG. 2 is a block diagram showing the construction of a second embodiment of the signal reproducing apparatus according to the present invention.

FIG. 2 is a block diagram showing the construction of a second embodiment of the signal reproducing apparatus according to the present invention. In FIG. 2, those parts which are the same as those corresponding parts in FIG. 1 are designated by the same reference numerals, and a description thereof will be omitted.

The construction of the provisional detector of this second embodiment differs from that of the first embodiment. In this embodiment, a signal reproducing apparatus 11 includes a provisional detector 12 having a (DFE) detector 13 and the feedback filter 7. A control circuit 14 includes the detector 9 and a controller 15.

The DFE detector 13 calculates an estimated waveform interference quantity from the preceding signal, and subtracts the estimated waveform interference quantity from the subtraction result $Y_n$ which is obtained from the subtracter 3 so as to obtain a calculation result. In addition, the DFE detector 13 makes a binary value judgment with respect to the calculation result, thereby making the provisional detection.

Figure 3:
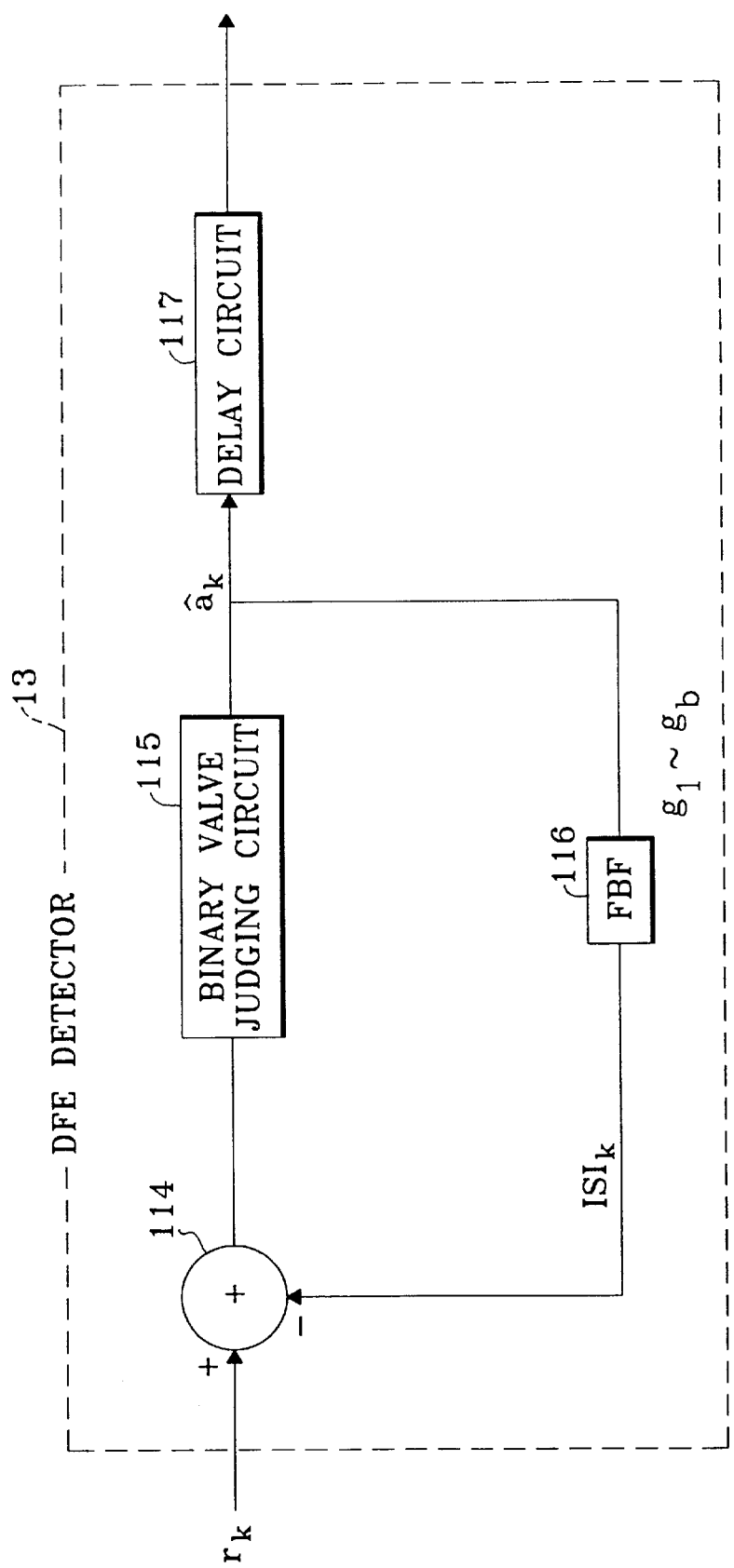
FIG. 3 is a block diagram showing the construction of a DFE detector of the second embodiment of the signal reproducing apparatus.

FIG. 3 is a block diagram showing the construction of the DFE detector 13 of the second embodiment. The DFE detector 13 includes a subtracter 114, a binary value judging circuit 115, a feedback filter 116 and a delay circuit 117.

The subtracter 114 subtracts an output signal ISIR of the feedback filter 116 from the subtraction result $Y_n$ (rk in FIG. 3), which is received from the subtracter 3. The output signal of the feedback filter 116 indicates the estimated waveform interference quantity. An output signal of the subtracter 114 is supplied to the binary value judging circuit 115, which binarizes the signal value into a binary value "+1" or "−1" depending on the level of the output signal of the subtracter 114. An output signal of the binary value judging circuit 115 is output via the delay circuit 117, and is supplied to the feedback filter 7.

The detector 9 compares the head reproduced signal with a sampling clock, and detects a ratio of the frequency of the head reproduced signal and the sampling clock frequency. The controller 15 varies weighting coefficients "g" of the DFE detector 13, the ML detector 4, the feedback filter 7 and the feedforward filter 2 to optimum values with respect to the frequency of the head reproduced signal, depending on the ratio detected by the detector 9. Thus, the optimum processing available for a head reproduced signal with a highly accurate detection can be achieved by varying the weighting coefficients "g" of the DFE detector 13, the ML detector 4, the feedback filter 7 and the feedforward filter 2 to optimum values with respect to the frequency of the head reproduced signal by the control circuit 14.

According to this embodiment, a provisional detection is made by the DFE detector 13, similarly to the first embodiment. The feedback filter 7 carries out a weighting with respect to the result of the provisional detection, and supplies the signal $X_n$ to the subtracter 3. The subtracter 3 subtracts the signal $X_n$ from the output signal $W_n$ of the feedforward filter 2, and outputs the subtraction result $Y_n$ by making the conversion into the waveform-interference waveform of τ bits. The subtraction result $Y_n$ is supplied to the ML detector 4, which carries out a τ-bit convolution. As a result, the equalization loss and the correlation noise are suppressed in the provisional detector 12, and the effects of the equalization detector 12, and the effects of the equalization loss and the correlation noise can be suppressed even if the detection made by the ML detector 4 has a small number of convolution steps, that is, a small circuit scale. For this reason, it is possible to obtain a signal reproducing apparatus which can reduce the equalization loss and the correlation noise using circuits having a small circuit scale. Accordingly, this embodiment can obtain a highly accurate reproduced signal. When this embodiment is applied to a disk unit, for example, it is possible to improve the reliability, reduce the circuit scale, and reduce the size and weight of the disk unit. In addition, it is possible to obtain a high-density recording due to the reduced error rate realized by this embodiment.

Also, with this second embodiment, it is possible to simplify ML detection process because the ML detection is carried out with respect to the third waveform-interference waveform which is reduced to τ bits from the T-bit first waveform-interference waveform. In addition, since the τ-bit third waveform-interference waveform is generated by subtracting the (T−τ)-bit second waveform-interference waveform from the T-bit first waveform-interference waveform, the ML detection is carried out with respect to the signal which is suppressed of the noise and loss beforehand.

Further, in this embodiment, it is also possible to carry out an optimum weighting with respect to the second waveform-interference waveform in the feedback filter. Thus, the provisional detection is highly accurate. Additionally, a highly accurate reproduced signal is obtained.

Finally, the provisional detection can be made using the existing FDTS and the existing DFE. This feature also makes it possible to obtain highly accurate reproduced signals. Also, when applied to a disk drive, the benefits discussed above are also achieved.

Figure 4:
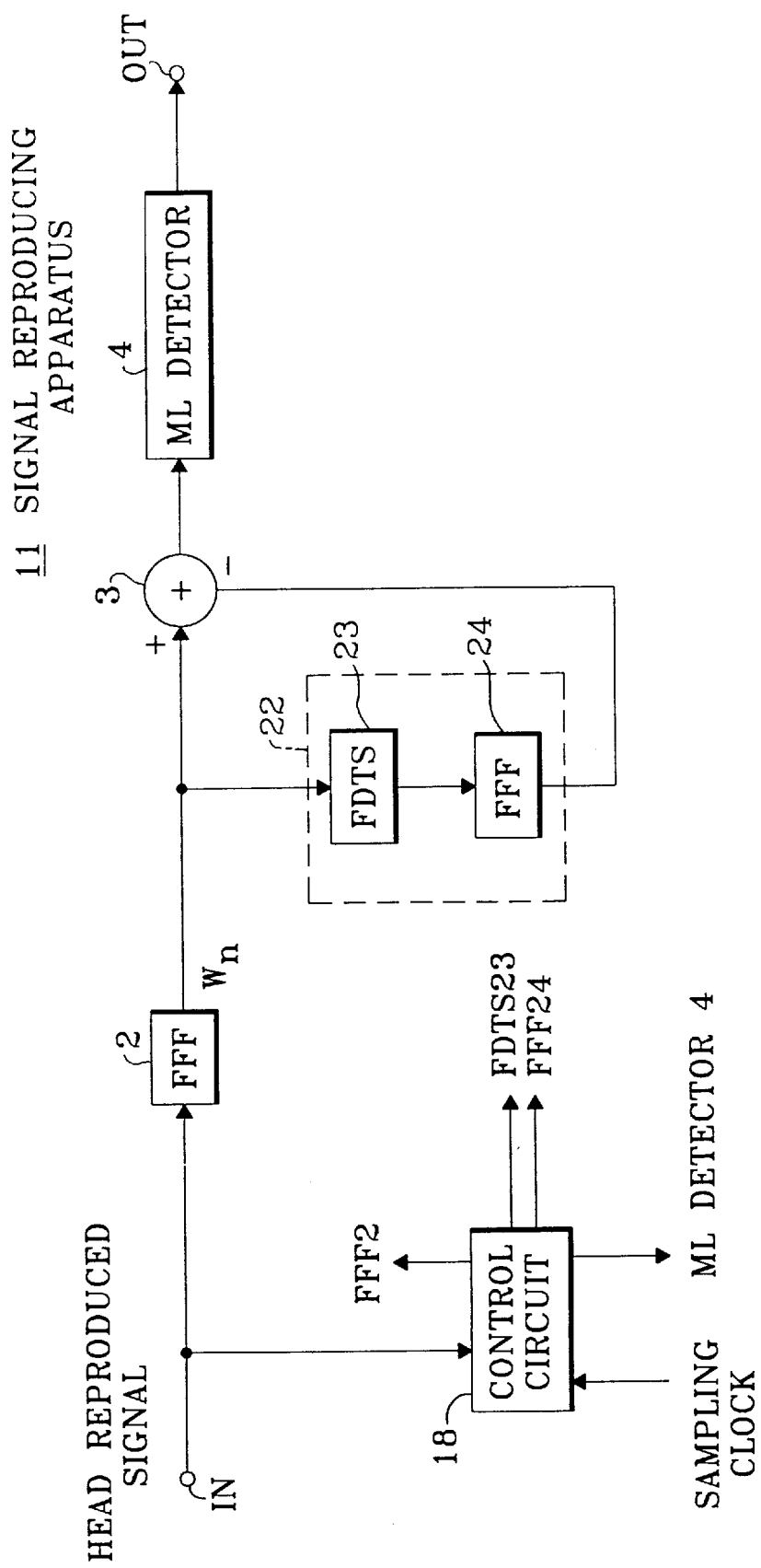
FIG. 4 is a block diagram showing the construction of a third embodiment of the signal reproducing apparatus according to the present invention.

FIG. 4 is a block diagram showing the construction of a third embodiment of the signal reproducing apparatus according to the present invention. In FIG. 4, those parts which are the same as those corresponding parts in FIG. 1 are designated by the same reference numerals, and a description thereof will be omitted.

In this embodiment a signal input position with respect to a provisional detector 22 which makes the provisional detection is different from that of the first embodiment shown in FIG. 1. In this embodiment, the provisional detector 22 includes a FDTS processor 23 and a feedforward filter 24. The FDTS processor 23 carries out a FDTS processing with respect to the output signal $W_n$ of the feedforward filter 2. The feedforward filter 24 carries out a weighting with respect to an output signal of the FDTS processor 23.

With respect to the signal subjected to the T-bit convolution in the feedforward filter 2, the FDTS processor 23 carries out a (T−τ)-bit convolution, and supplies a resulting signal to the feedforward filter 24. The feedforward filter 24 carries out a weighting on the output signal of the FDTS processor 23, and an output signal of the feedforward filter 24 is supplied to the subtracter 3.

According to this embodiment, the provisional detector 22 suppresses the equalization loss and the correlation noise, similarly to the first and second embodiments, and thus, it is possible to reduce the equalization loss, the correlation noise and the error rate. Accordingly, this embodiment can obtain a highly accurate reproduced signal. When applied to a disk unit, the benefits discussed above are also achieved.

Additionally, with this third embodiment it is possible to simplify the ML detection process because the ML detection is carried out with respect to the fourth waveform-interference waveform which is reduced to r bits from the T-bit first waveform-interference waveform. In addition, since the i-bit fourth waveform-interference waveform is generated by subtracting the (T−τ)-bit third waveform interference waveform from the T-bit first waveform interference waveform, the ML detection is carried out with respect to the signal which is suppressed of the noise and loss beforehand. As a result, the quantization loss and the correlation noise can be suppressed at the time of the ML detection.

In this embodiment, it is also possible to carry out an optimum weighting with respect to the third waveform-interference waveform in the second filter, thereby enabling a highly accurate provisional detection. For this reason also, a highly accurate reproduced signal can be obtained.

Further, an optimum processing dependent upon the input signal frequency and a highly accurate detection become possible by varying the coefficient of the feedforward filter, the provisional detector, the feedback filter and the ML detection means to optimum values with respect to the input signal frequency by the control means.

Furthermore, it is possible to reduce the number of convolution steps of the ML detector 4. As a result, it is possible to reduce the circuit scale as a whole.

Figure 5:
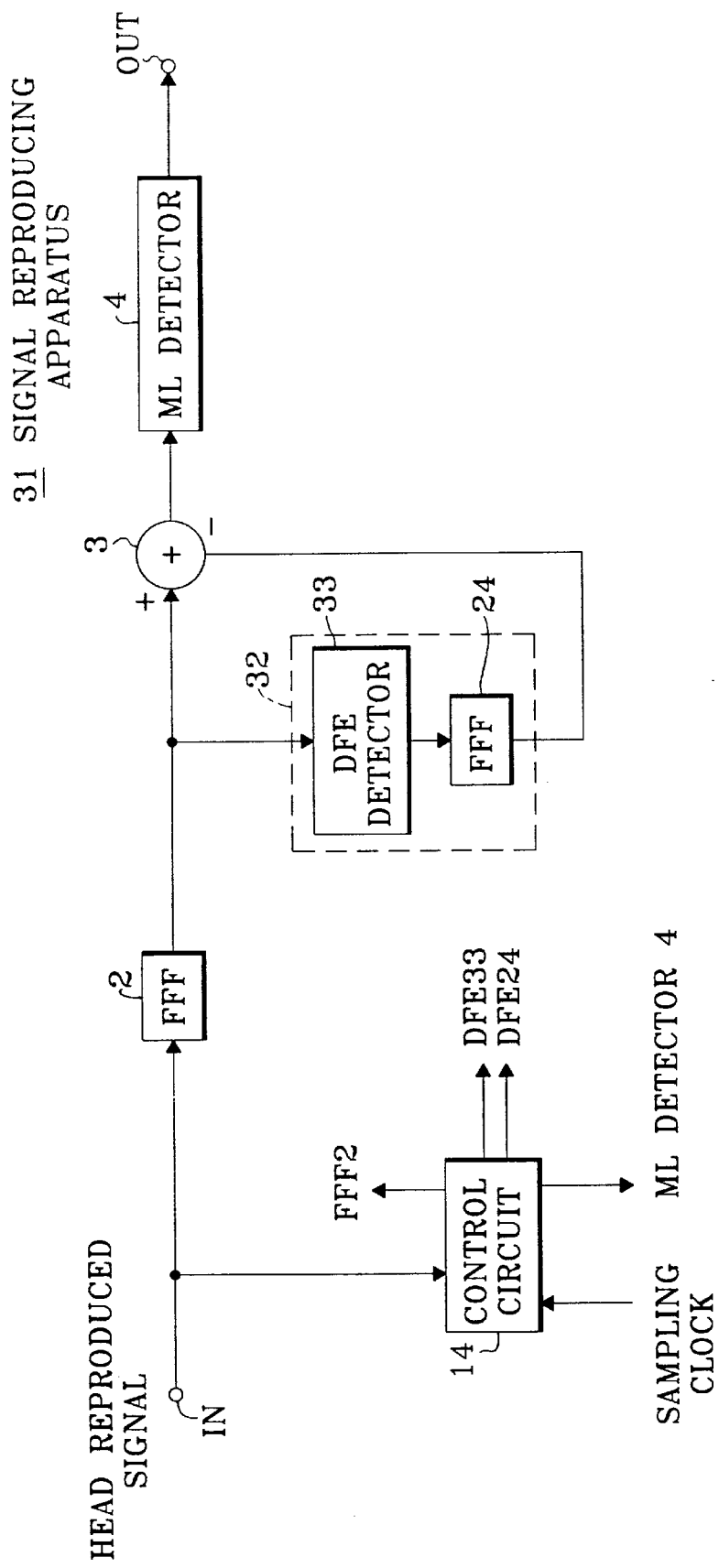
FIG. 5 is a block diagram showing the construction of the fourth embodiment of the signal reproducing apparatus according to the present invention.

FIG. 5 is a block diagram showing the construction of a fourth embodiment of the signal reproducing apparatus according to the present invention. In FIG. 5, those parts which are the same as those corresponding parts in FIG. 4 are designated by the same reference numerals, and a description thereof will be omitted.

In a provisional detector 32 of a signal reproducing apparatus 31 of this embodiment, a DFE detector 33 which is similar to the DFE detector 13 of the second embodiment shown in FIG. 3 is used in place of the FDTS processor 23 of the provisional detector 22 of the third embodiment shown in FIG. 4.

According to this embodiment, the provisional detector 32 suppresses the equalization loss and the correlation noise, similarly to the first through third embodiments, and thus, it is possible to reduce the equalization loss, the correlation noise and the error rate. Accordingly, this embodiment can obtain a highly accurate reproduced signal. When this embodiment is applied to a disk unit, for example, it is possible to improve the reliability, reduce the circuit scale, and reduce the size and weight of the disk unit. In addition, it is possible to realize a high-density recording due to the reduced error rate realized by this embodiment.

Furthermore, it is possible to reduce the number of convolution steps of the ML detector 4. As a result, it is possible to reduce the circuit scale as a whole.

Figure 6:
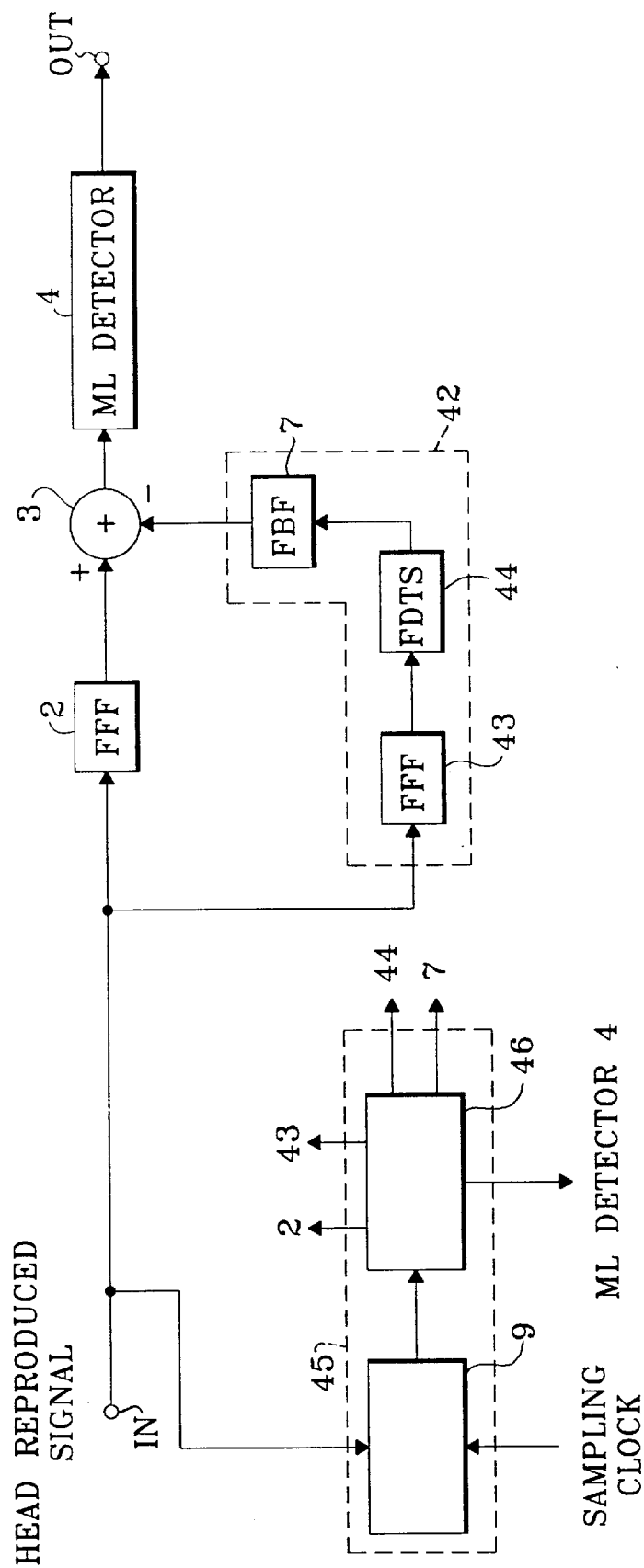
FIG. 6 is a block diagram showing the construction of a fifth embodiment of the signal reproducing apparatus according to the present invention.

FIG. 6 is a block diagram showing the construction of a fifth embodiment of the signal reproducing apparatus according to the present invention. In FIG. 6, those parts which are the same as those corresponding parts in FIG. 1 are designated by the same reference numerals, and a description thereof will be omitted.

In a signal reproducing apparatus 41 of this embodiment, the construction of a provisional detector 42 differs from the provisional detector 5 of the first embodiment shown in FIG. 1. In this embodiment, the provisional detector 42 includes a feedforward filter 43, a FDTS processor 44 and the feedback filter 7, which functions more like a feedforward filter in this embodiment.

The feedforward filter 43 has a construction similar to that of the feedforward filter 2. The feedforward filter 43 carries out a wave-shaping process with respect to the head reproduced signal so that the level of the head reproduced signal will not affect the preceding signal, and carries out an equalization of the target waveform by controlling the waveform interference to the subsequent signal constant. The characteristic of the feedforward filter 43 is set to be different from that of the feedforward filter 2, so that the feedforward filter 43 has an optimum characteristic with respect to the FDTS processing that is carried out by the FDTS processor 44. For example, the value of the weighting coefficient $g_n$ in the formula (2) is set to a value corresponding to the number of convolution steps in the FDTS processor 44.

An output signal of the feedforward filter 43 is supplied to the FDTS processor 44. The FDTS processor 44 has a construction similar to that of the FDTS processor 6 described above. The FDTS processor 44 carries out a (T−τ)-bit convolution with respect to the output signal of the feedforward filter 43, and an output of this FDTS processor 44 is supplied to the subtracter 3 via the feedback filter 7.

A control circuit 45 includes the detector 9 and a controller 46. The detector 9 compares the head reproduced signal with the sampling clock, and detects the ratio of the frequency of the head reproduced signal and the sampling clock frequency. The controller 46 varies the weighting coefficients g of the FDTS processor 44, the ML detector 4, the feedforward filter 43, the feedback filter 7 and the feedforward filter 2 to optimum values with respect to the frequency of the head reproduced signal, depending on the ratio detected by the detector 9. Thus, the optimum processing available for a head reproduced signal with highly accurate detection can be achieved by varying the weighting coefficients g of the FDTS processor 44, the ML detector 4, the feedforward filter 43, the feedback filter 7 and the feedforward filter 2 to optimum values with respect to the frequency of the head reproduced signal by the control circuit 45.

According to this embodiment, the provisional detector 42 suppresses the equalization loss and the correlation noise, similarly to the first through fourth embodiments, and thus, it is possible to reduce the equalization loss, the correlation noise and the error rate. Accordingly, this embodiment can also obtain a highly accurate reproduced signal. When applied to a disk unit, the benefits discussed above are achieved.

Furthermore, it is possible to reduce the number of convolution steps of the ML detector 4 with this embodiment. As a result, it is possible to reduce the circuit scale as a whole.

In addition, the provisional detector 42 can carry out a highly accurate provisional detection, because the feedforward filter 43 is provided independently to directly receive and process the head reproduced signal, and also because the feedforward filter 43 can be set to have an optimum characteristic with respect to the FDTS processing that is carried out in the FDTS processor 44. As a result, the equalization loss and the correlation noise can be suppressed more efficiently.

Figure 7:
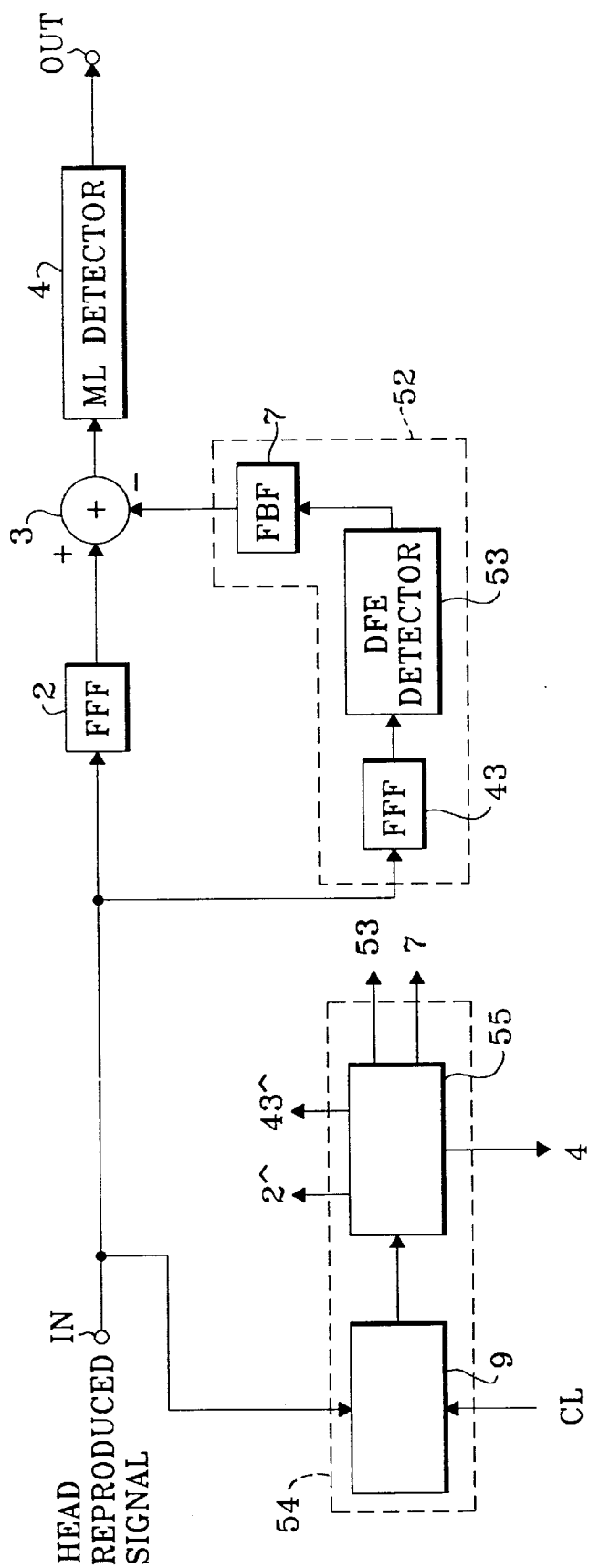
FIG. 7 is a block diagram showing the construction of a sixth embodiment of the signal reproducing apparatus according to the present invention.
Figure 8:
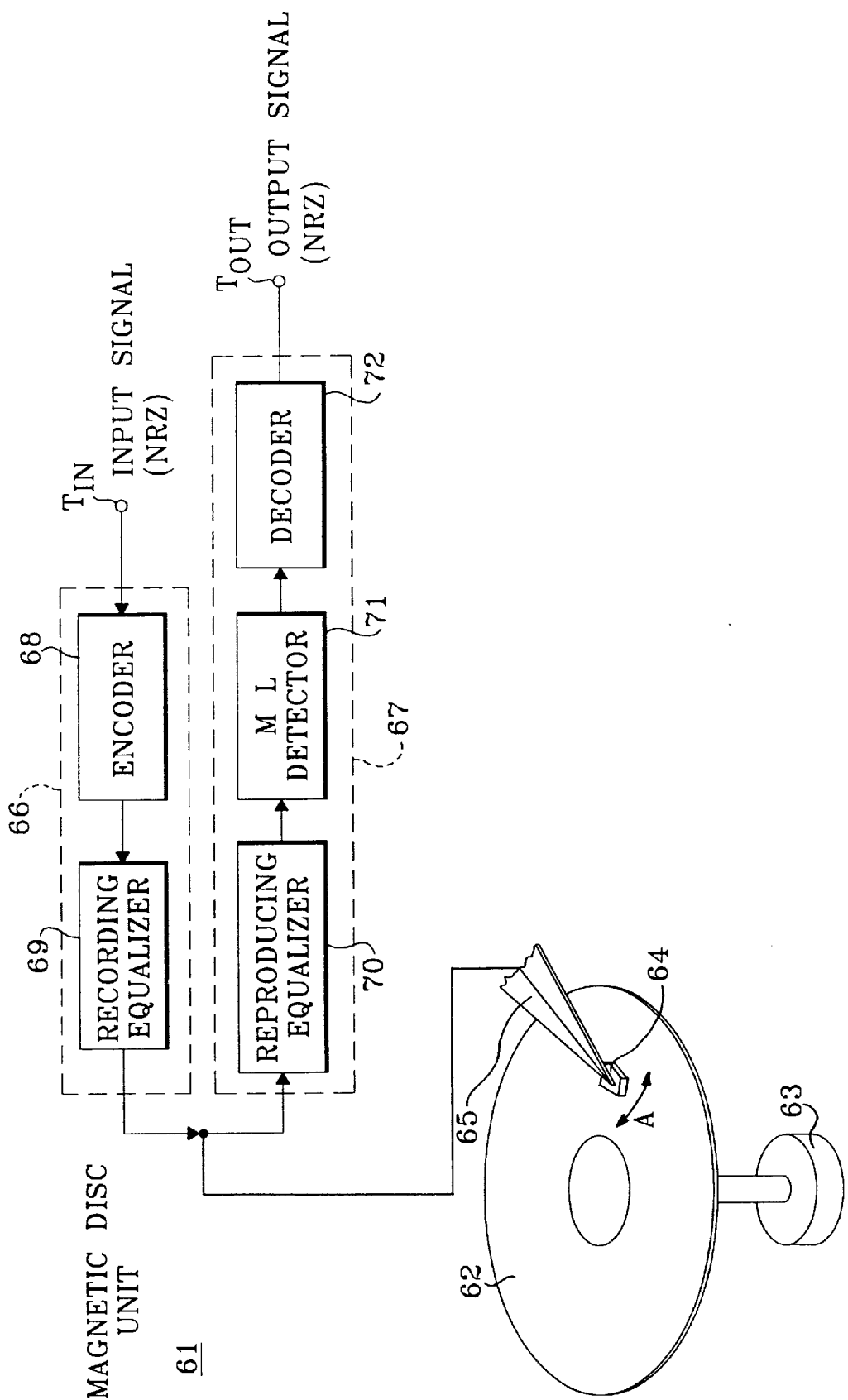
FIG. 8 is a diagram showing the general construction of a hard disk unit.
Figure 9:
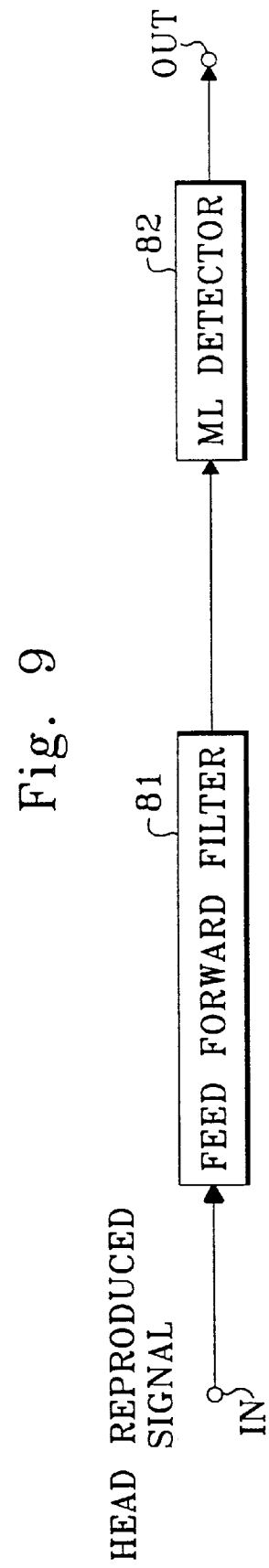
FIG. 9 is a block diagram showing the construction of a reproducing system employing the PR technique.
Figure 10A:
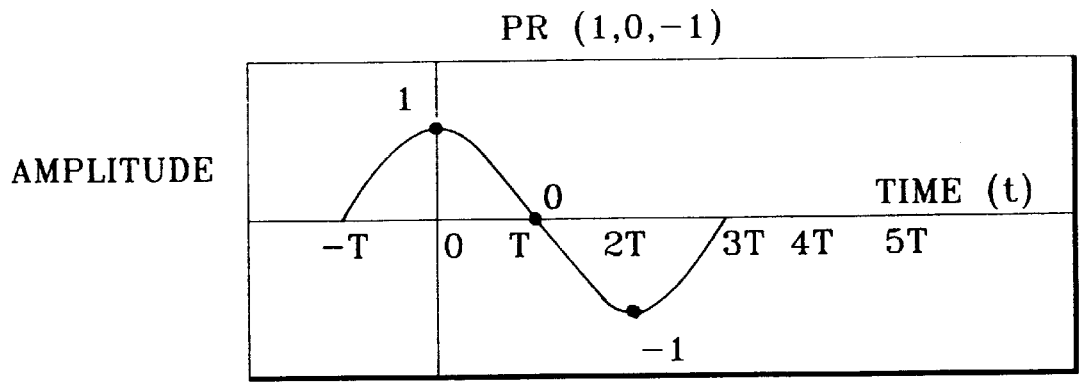
FIGS. 10A–10C are diagrams showing impulse response characteristics of the PR technique.
Figure 10B:
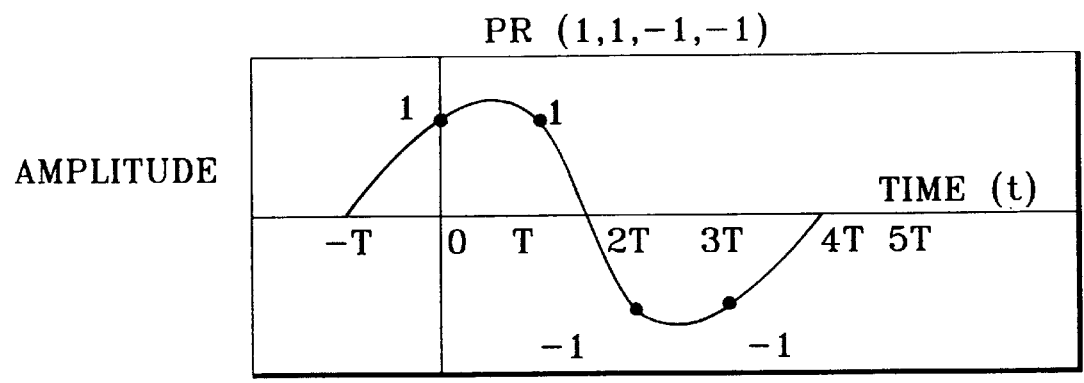
Figure 10C:
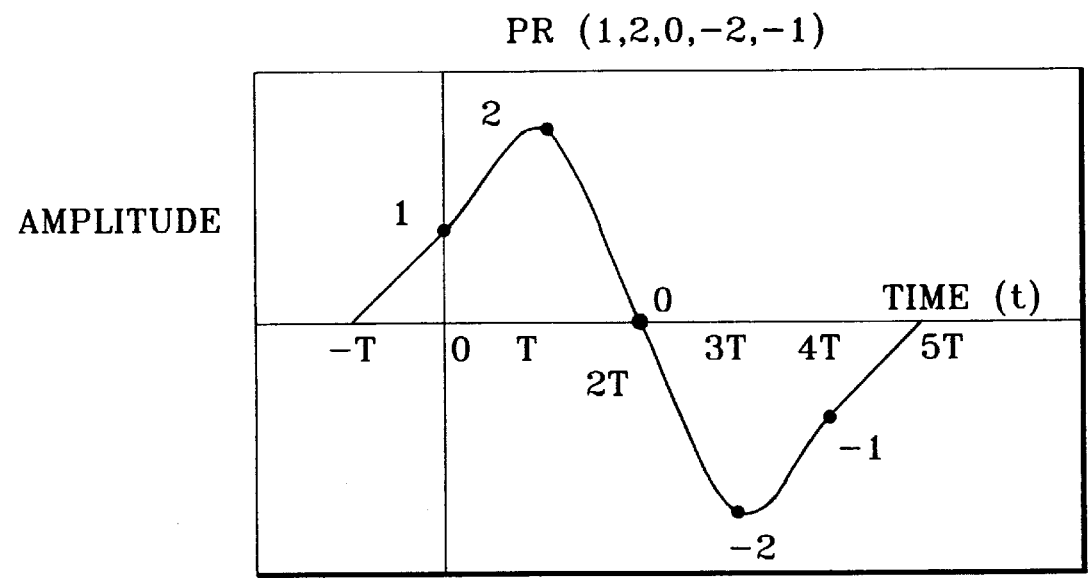
Figure 12:
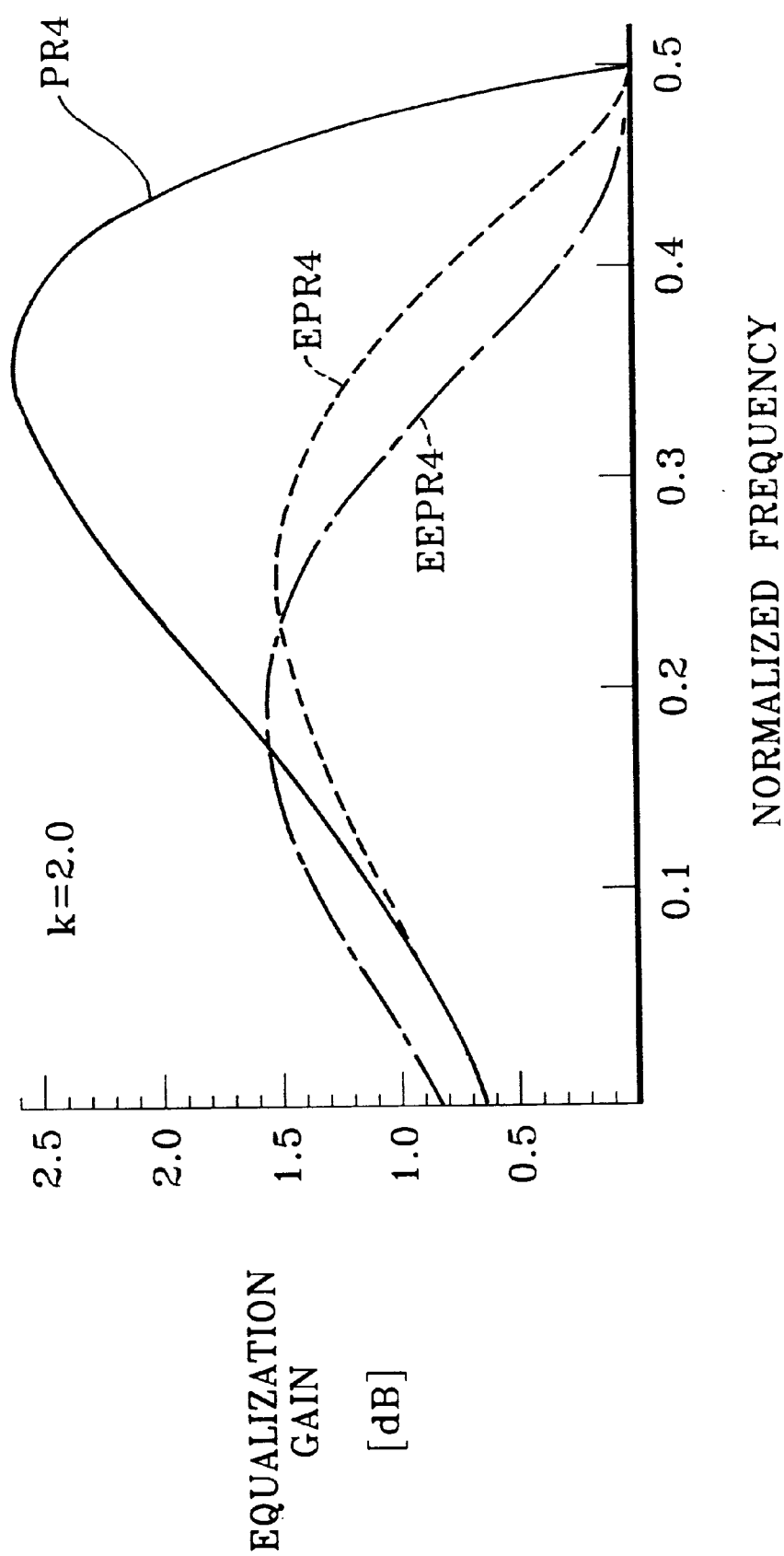
FIG. 12 is a diagram showing equalization gains with respect to normalized frequency for the PR4, EPR4 and EEPR4.
Figure 13:
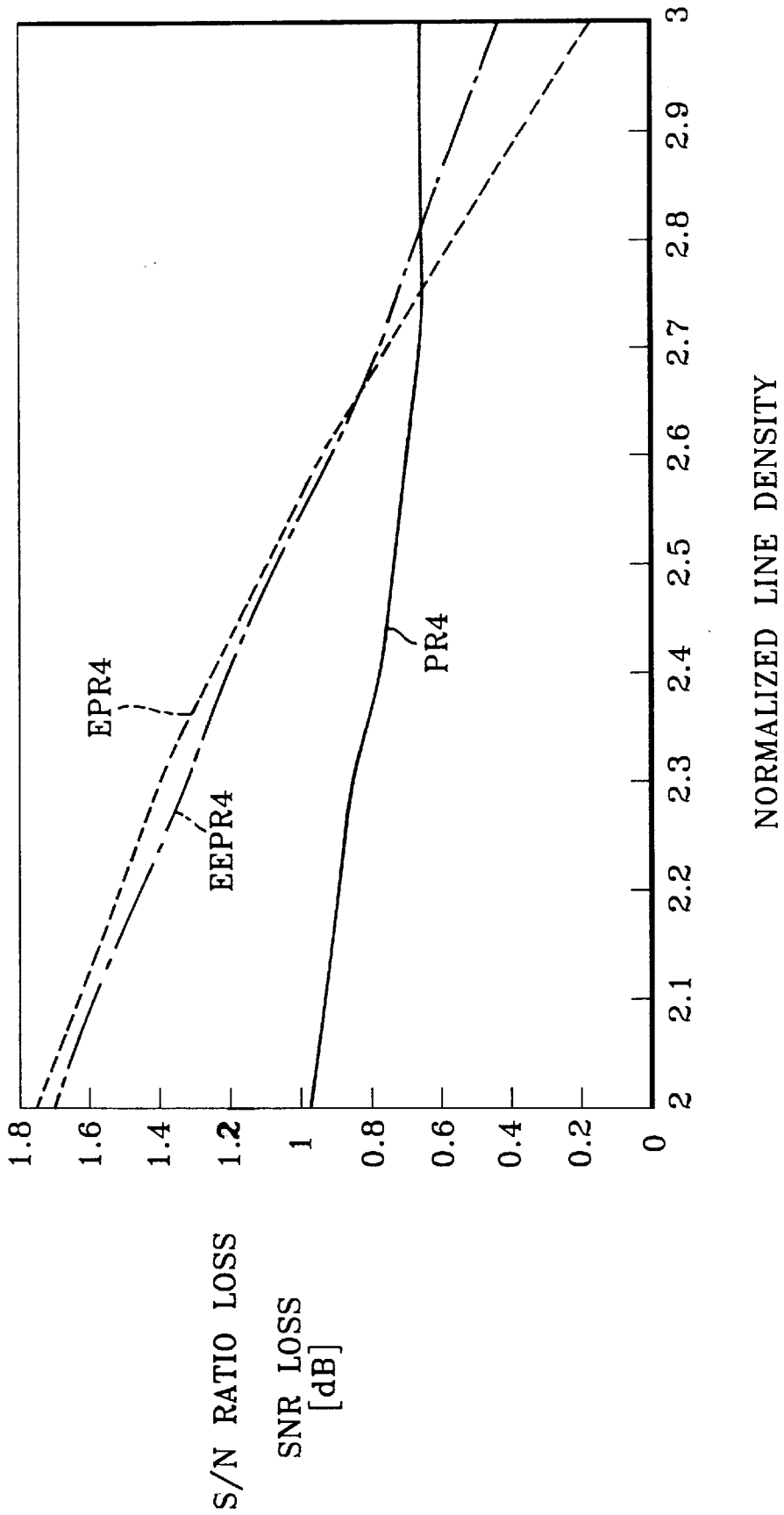
FIG. 13 is a diagram showing S/N ratio losses with respect to normalized line density for the PR4, EPR4 and EEPR4.
Figure 14:
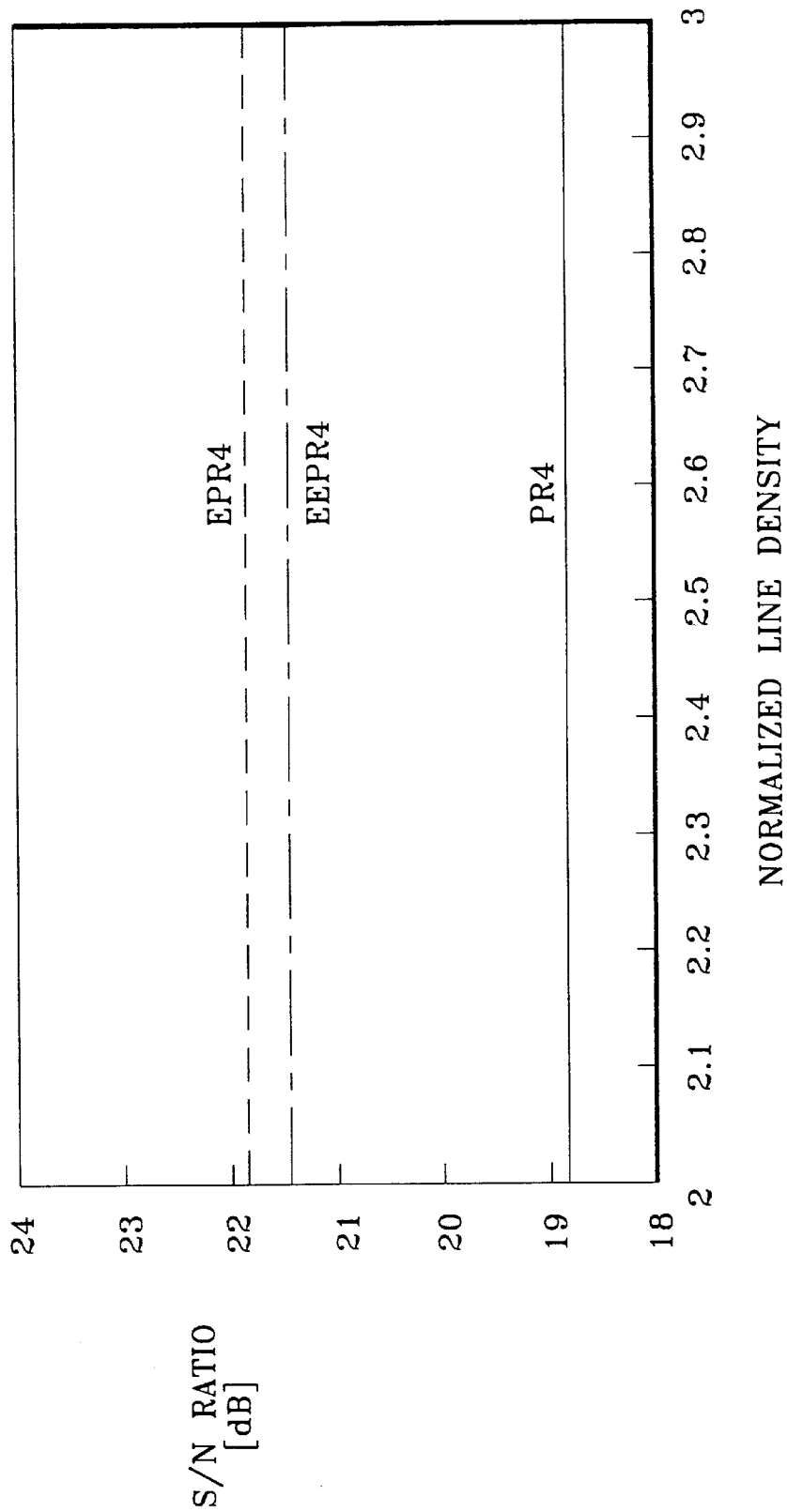
FIG. 14 is a diagram showing S/N ratios at a portion of an ML detector with respect to normalized line density of recording information for the PR4, EPR4 and EEPR4.
Figure 15:
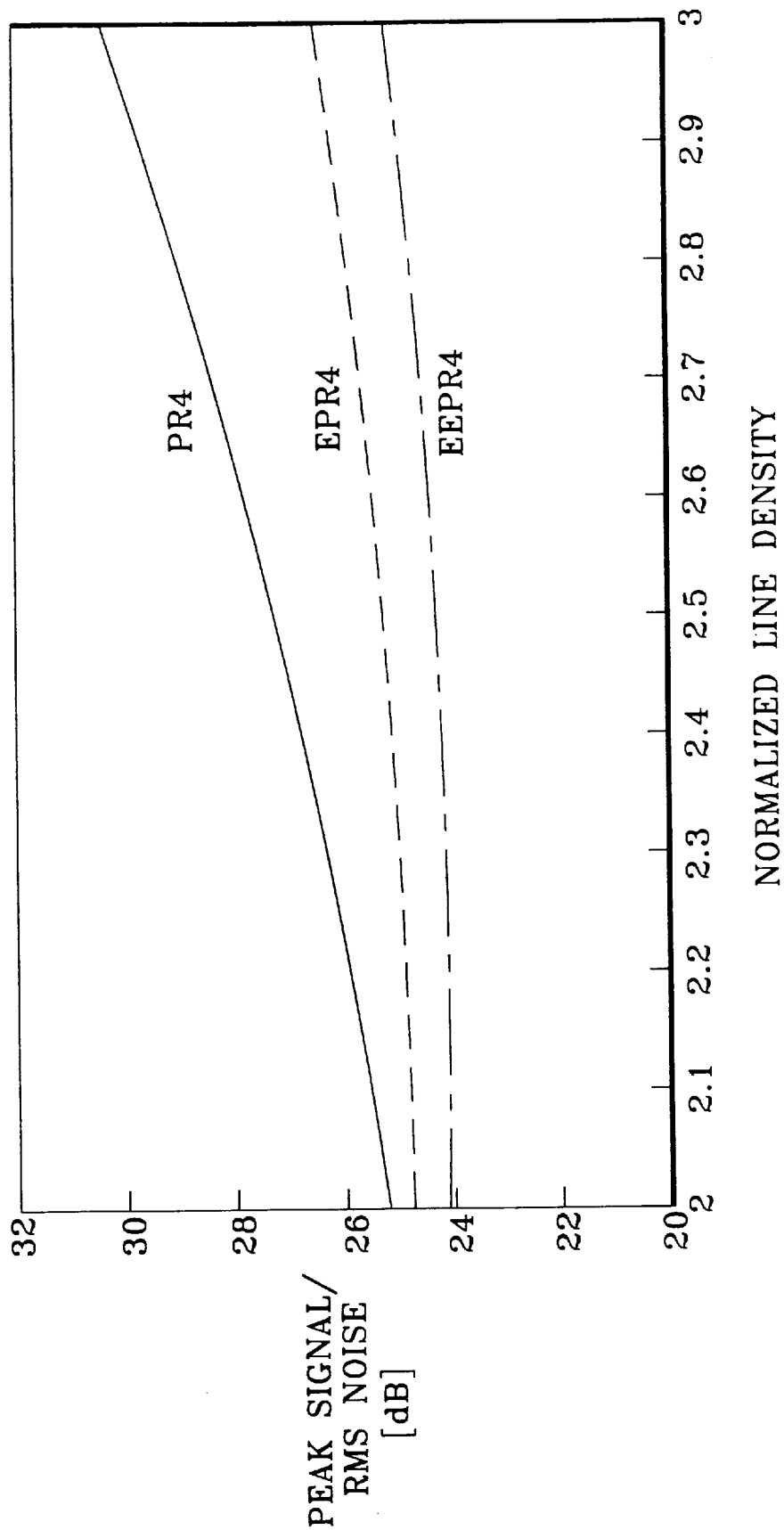
FIG. 15 is a diagram showing peak signal/RMS noise with respect to normalized line density of recording information for the PR4, EPR4 and EEPR4.
Figure 16:
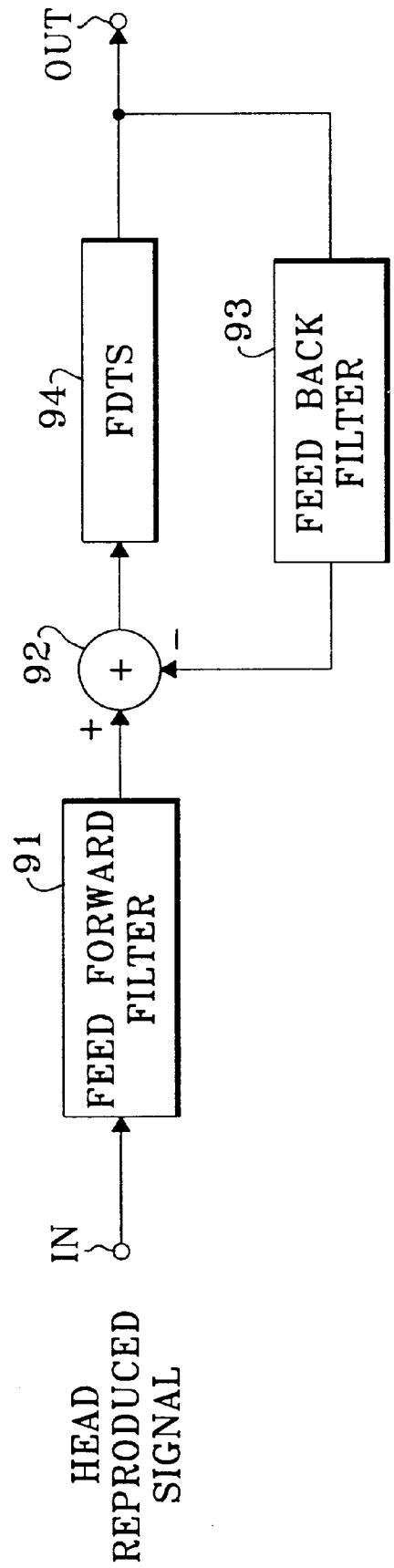
FIG. 16 is a block diagram showing the construction of a reproducing system employing FDTS/DF technique.
Figure 17:
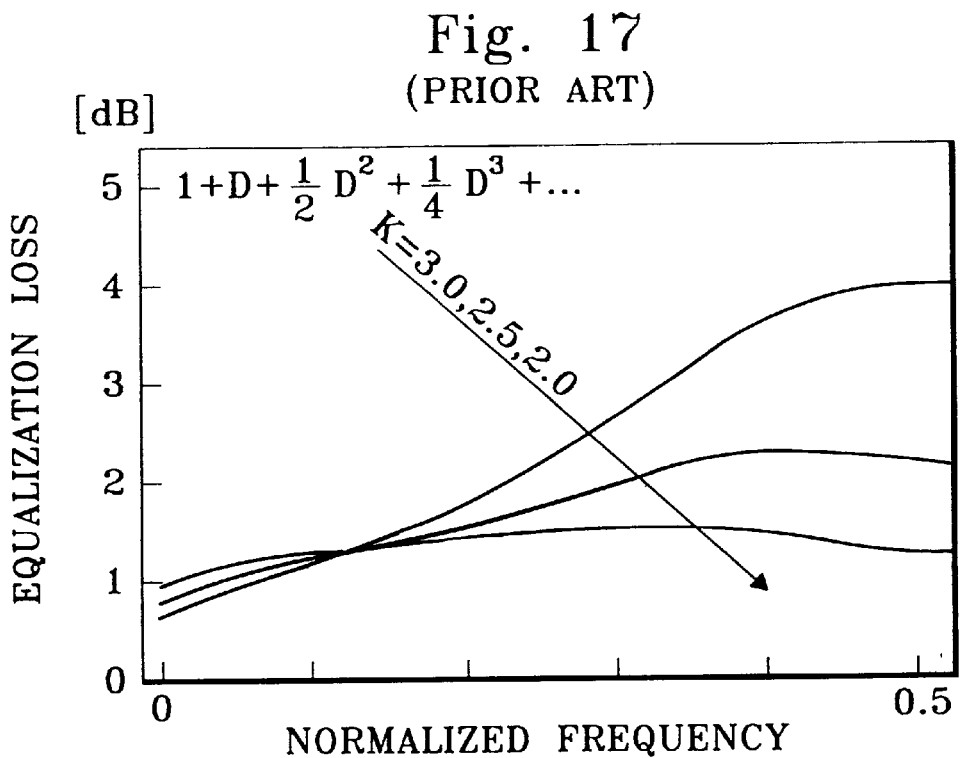
FIG. 17 is a diagram showing equalization loss versus the normalized frequency characteristic of the FDTS/DF feedforward filter.
Figure 18:
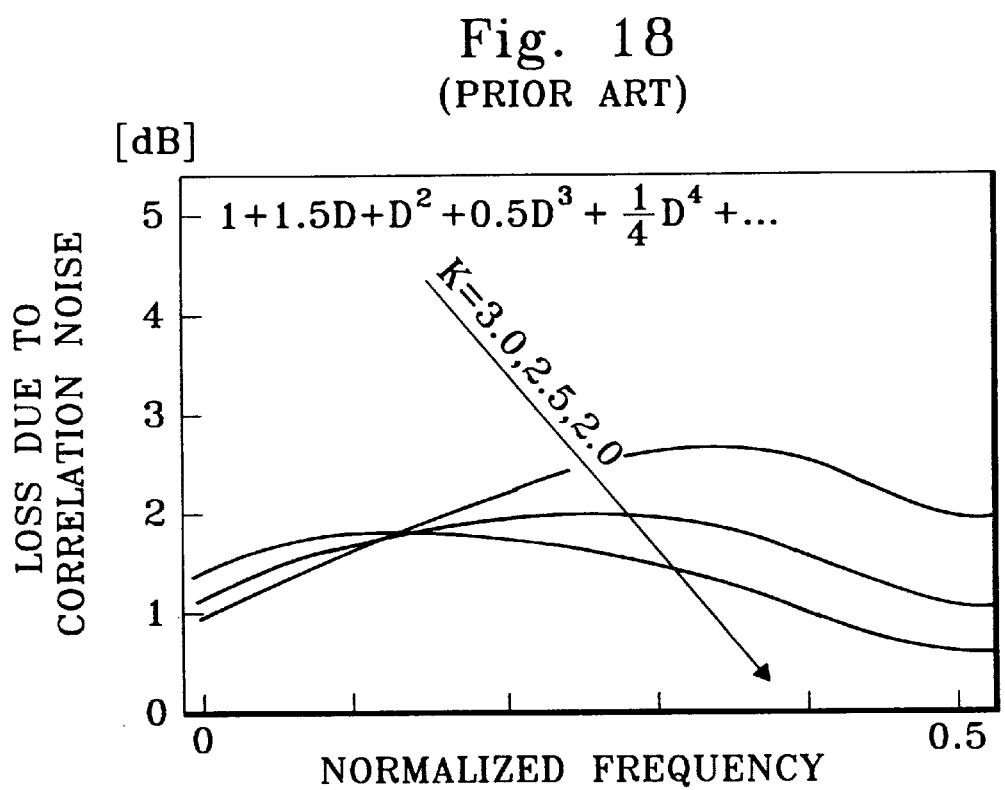
FIG. 18 is another diagram showing equalization loss versus the normalized frequency characteristic for the FDTS/DF feedforward filter.
Figure 19:
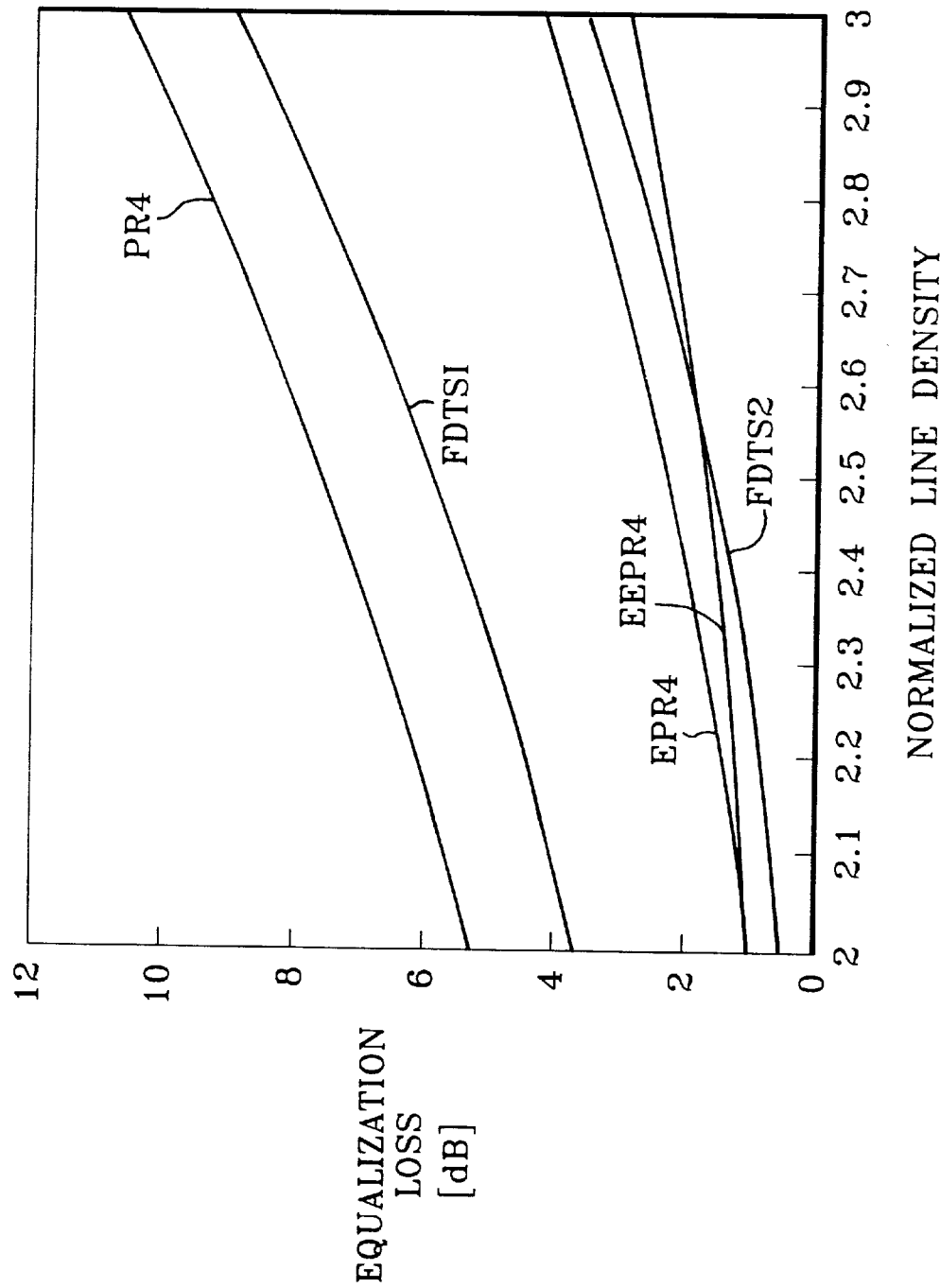
FIG. 19 is a diagram showing equalization losses versus the frequency characteristic for the PR4, EPR4, EEPR4 and FDTS/DF.

FIG. 7 is a block diagram showing a sixth embodiment of the signal reproducing apparatus according to the present invention. In FIG. 7, those parts which are the same as those corresponding parts in FIG. 6 are designated by the same reference numerals, and a description thereof will be omitted.

In a signal reproducing apparatus 51 of this embodiment, the construction of a provisional detector 52 is different from that of the provisional detector 42 of the fifth embodiment shown in FIG. 6. In the provisional detector 52 of this embodiment, a DFE detector 53 similar to the DFE detector 13 of the second embodiment shown in FIG. 3 is used in place of the FDTS processor 44 of the provisional detector 42 of the fifth embodiment shown in FIG. 6.

In addition, a control circuit 54 includes the detector 9 and a controller 55. The detector 9 compares the head reproduced signal with the sampling clock and detects the ratio of the frequency of the head reproduced signal and the sampling clock frequency. The controller 55 varies the weighting coefficients "g" of the DFE detector 53, the ML detector 4, the feedforward filter 43, the feedforward filter 7 and the feedforward filter 2 to optimum values with respect to the frequency of the head reproduced signal, depending on the ratio detected by the detector 9.

The optimum processing available for a head reproduced signal with a highly accurate detection can be achieved by varying the weighting coefficients "g" of the DFE detector 53, the ML detector 4, the feedforward filter 43, the feedback filter 7 and the feedforward filter 2 to optimum values with respect to the frequency of the head reproduced signal by the control circuit 54.

According to this embodiment, the provisional detector 52 suppresses the equalization loss and the correlation noise, similarly to the fifth embodiment, and thus, it is possible to reduce the equalization loss, the correlation noise and the error rate. Accordingly, this embodiment can also obtain a highly accurate reproduced signal, and when applied to a disk unit, achieve the benefits discussed above.

Furthermore, it is possible to reduce the number of convolution steps of the ML detector 4. As a result, it is possible to reduce the circuit scale as a whole.

In addition, the provisional detector 52 can carry out a highly accurate provisional detection, because the feedforward filter 43 is provided independently to directly receive and process the head reproduced signal, and the feedforward filter 43 can be set to have an optimum characteristic with respect to the processing that is carried out in the DFE detector 53. As a result, the equalization loss and the correlation noise can be suppressed more efficiently.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A signal reproducing method for reproducing an input signal, comprising the steps of:

generating from the input signal a first waveform-interference waveform which is subjected to a T-bit convolution;

generating from an established second waveform-interference waveform which has been subjected to a $\tau$-bit convolution a third waveform-interference waveform which is subjected to a weighting and a (T–$\tau$)-bit convolution;

varying a weighting coefficient depending on a ratio of a frequency of the input signal and a sampling frequency;

subtracting said third waveform-interference waveform from said first waveform-interference waveform so as to adjust said second waveform-interference waveform; and reproducing the input signal by carrying out a Maximum Likelihood (ML) detection with respect to said adjusted second waveform-interference waveform.

2. A signal reproducing method for reproducing an input signal, comprising the steps of:

generating from the input signal a first waveform-interference waveform which is subjected to a T-bit convolution;

generating from said first waveform-interference waveform a second waveform-interference waveform which is subjected to a weighting and a (T–$\tau$)-bit convolution;

varying a weighting coefficient depending on a ratio of a frequency of the input signal and a sampling frequency;

subtracting said second waveform-interference waveform from said first waveform-interference waveform so as to generate a $\tau$-bit third waveform-interference waveform; and reproducing the input signal by carrying out a Maximum Likelihood (ML) detection with respect to said third waveform-interference waveform.

3. A signal reproducing method for reproducing an input signal, comprising:

a first step of generating from said input signal a first waveform-interference waveform which is subjected to a T-bit convolution;

a second step of generating from said input signal a second waveform-interference waveform which is subjected to a T-bit convolution;

a third step of generating from said second waveform-interference waveform a third waveform-interference waveform which is subjected to a weighting and a (T–$\tau$)-bit convolution;

a fourth step of subtracting said third waveform-interference waveform from said first waveform-interference waveform so as to generate a $\tau$-bit fourth waveform-interference waveform; and a fifth step of reproducing said input signal by carrying out a Maximum Likelihood (ML) detection with carrying out a Maximum Likelihood (ML) detection with respect to said fourth waveform-interference waveform.

4. A signal reproducing apparatus for reproducing an input signal, comprising:

a first filter generating from the input signal a first waveform-interference waveform which is subjected to a T-bit convolution;

provisional detection means for generating from an established second waveform-interference waveform which has been subjected to a $\tau$-bit convolution a third waveform-interference waveform which is subjected to a weighting and a (T–$\tau$)-bit convolution;

control means for varying coefficients of said provisional detection means depending on a ratio of a frequency of the input signal and a sampling frequency;

at subtracter for subtracting said third waveform-interference waveform from said first waveform-interference waveform so as to adjust said second waveform-interference waveform; and ML detection means for reproducing the input signal by carrying out a Maximum Likelihood (ML) detection with respect to said adjusted second waveform-interference waveform.

5. The signal reproducing apparatus as claimed in claim 4, wherein said provisional detection means comprises:

a provisional detector generating said third waveform-interference waveform from said second waveform-interference waveform; and a second filter carrying out said weighting with respect to said third waveform-interference waveform generated from said provisional detector.

6. The signal reproducing apparatus as claimed in claim 5, wherein said provisional detector includes possible paths arranged in a tree format, obtains a mean-square error between a sampled value of the second waveform-interference waveform and an anticipated value under a noise-fee condition, and outputs a most likely path out of the possible paths arranged in the tree format depending on said mean-square error according to a Fixed Delay Tree Search with Decision Feedback (FDTS/DF) algorithm.

7. The signal reproducing apparatus as claimed in claim 5, wherein said provisional detector includes a Decision Feedback Equalization (DFE) detector which carries out a provisional detection by calculating an estimated waveform interference quantity from a preceding waveform-interference waveform, obtaining a subtraction result by subtracting the estimated waveform interference quantity from said second waveform-interference waveform, and making a binary value judgment with respect to the subtraction result.

8. The signal reproducing apparatus as claimed in claim 5, wherein said control means varies coefficients of said first filter, said provisional detector, said second filter and said ML detection means depending on said ratio of said frequency of the input signal and said sampling frequency.

9. The signal reproducing apparatus as claimed in claim 7, wherein said control means varies coefficients of said first filter, said provisional detector, said second filter and said ML detection means depending on said ratio of said frequency of the input signal and said sampling frequency.

10. A signal reproducing apparatus for reproducing an input signal, comprising:

a first filter for generating from the input signal a first waveform-interference waveform which is subjected to a T-bit convolution;

provisional detection means for generating from said first waveform-interference waveform a second waveform-interference waveform which is subjected to a (T–τ)-bit convolution;

control means for varying coefficients of said provisional detection means depending on a ratio of a frequency of the input signal and a sampling frequency;

a subtracter for subtracting said second waveform-interference waveform from said first waveform-interference waveform so as to generate a τ-bit third waveform-interference waveform; and ML detection means for reproducing the input signal by carrying out a Maximum Likelihood (ML) detection with respect to said third waveform-interference waveform.

11. The signal reproducing apparatus as claimed in claim 10, wherein said provisional detection means comprises:

a provisional detector for generating said second waveform-interference waveform from said first waveform-interference waveform; and a second filter carrying out said weighting with respect to said second waveform-interference waveform generated from said provisional detector.

12. The signal reproducing apparatus as claimed in claim 11, wherein said provisional detector includes possible paths arranged in a tree format, obtains a mean-square error between a sampled value of the third waveform-interference waveform and an anticipated value under a noise-free condition, and outputs a most likely path out of the possible paths arranged in the tree format depending on said mean-square error according to a Fixed Delay Tree Search with Decision Feedback (FDTS/DF) algorithm.

13. The signal reproducing apparatus as claimed in claim 11, wherein said provisional detector includes a Decision Feedback Equalization (DFE) detector which carries out a provisional detection by calculating an estimated waveform interference quantity from a preceding waveform-interference waveform, obtaining a subtraction result by subtracting the estimated waveform interference waveform, and making a binary value judgment with respect to the subtraction result.

14. The signal reproducing apparatus as claimed in claim 11, wherein said control means varies coefficients of said first filter, said provisional detector, said second filter and said ML detection means depending on said ratio of said frequency of the input signal and said sampling frequency.

15. The signal reproducing apparatus as claimed in claim 13, wherein said control means varies coefficients of said first filter, said provisional detector, said second filter and said ML detection means depending on said ratio of said frequency of the input signal and said sampling frequency.

16. A signal reproducing apparatus for reproducing an input signal, comprising:

a first filter for generating from said input signal a first waveform-interference waveform which is subjected to a T-bit convolution;

a second filter for generating from said input signal a second waveform-interference waveform which is subjected to a (T–τ)-bit convolution;

provisional detection means for generating from said second waveform-interference waveform a third waveform-interference waveform which is subjected to a (T–τ-bit convolution;

a subtracter for subtracting said third waveform-interference waveform from said first waveform-interference waveform so as to generate a τ-bit fourth waveform-interference waveform; and ML detection means for reproducing said input signal by carrying out a Maximum Likelihood (ML) detection with respect to said fourth waveform-interference waveform.

17. The signal reproducing apparatus as claimed in claim 16, wherein said provisional detection means comprises:

a provisional detector for generating the third waveform-interference waveform from the second waveform-interference waveform; and a third filter for carrying out a weighting with respect to the third waveform-interference waveform generated from said provisional detector.

18. The signal reproducing apparatus as claimed in claim 17, wherein said provisional detector includes possible paths arranged in a tree format, obtains a mean-square error between a sampled value of the second waveform-interference waveform and an anticipated value under a noise-free condition, and outputs a most likely path out of the possible paths arranged in the tree format depending on said mean-square error according to a Fixed Delay Tree Search with Decision Feedback (FDTS/DF) algorithm.

19. The signal reproducing apparatus as claimed in claim 17, wherein said provisional detector includes a Decision Feedback Equalization (DFE) detector which carries out a provisional detection by calculating an estimated waveform interference quantity from a preceding waveform-interference waveform, obtaining a subtraction result by subtracting the estimated waveform interference quantity from said fourth waveform-interference waveform, and making a binary value judgment with respect to the subtraction result.

20. The signal reproducing apparatus as claimed in claim 17, further comprising:

control means for varying coefficients of said first filter, said provisional detector, said second filter, said third filter and said ML detection means depending on a ratio of a frequency of said input signal and a sampling frequency.

21. The signal reproducing apparatus as claimed in claim 19, further comprising:

control means for varying coefficients of said first filter, said provisional detector, said second filter, said third filter and said ML detection means depending on a ratio of a frequency of said input signal and a sampling frequency.

22. A signal reproducing apparatus for reproducing an input signal, comprising:

a first filter generating from the input signal a first waveform-interference waveform which is subjected to a T-bit convolution;

provisional detection means for generating from an established second waveform-interference waveform which has been subjected to a $\tau$-bit convolution, a third waveform-interference waveform which is subjected to a weighting and a $(T-\tau)$-bit convolution;

said provisional detection means including a provisional detector generating said third waveform-interference waveform from said second waveform-interference waveform, and a second filter carrying out said weighting with respect to said third waveform-interference waveform generated from said provisional detector;

said provisional detector including a Decision Feedback Equalization (DFE) detector which carries out a provisional detection by calculating an estimated waveform interference quantity from a preceding waveform-interference waveform, obtaining a subtraction result by subtracting said estimated waveform interference quantity from said second waveform-interference waveform, and making a binary value judgment with respect to said subtraction result;

a subtracter for subtracting said third waveform-interference waveform from said first waveform-interference waveform so as to adjust said second waveform-interference waveform; and ML detection means for reproducing the input signal by carrying out a Maximum Likelihood (ML) detection with respect to said adjusted second waveform-interference waveform.

23. The signal reproducing apparatus as claimed in claim 22, further comprising control means for varying coefficients of said first filter, said provisional detector, said second filter and said ML detection means depending on a ratio of a frequency of the input signal and a sampling frequency.

24. A signal reproducing apparatus for reproducing an input signal, comprising:

a first filter generating from the input signal a first waveform-interference waveform which is subjected to a T-bit convolution;

provisional detection means for generating from an established second waveform-interference waveform which has been subjected to a $\tau$-bit convolution, a third waveform-interference waveform which is subjected to a weighting and a $(T-\tau)$-bit convolution;

said provisional detection means including a provisional detector generating said third waveform-interference waveform from said second waveform-interference waveform, and a second filter carrying out said weighting with respect to said third waveform-interference waveform generated from said provisional detector;

a subtracter for subtracting said third waveform-interference waveform from said first waveform-interference waveform so as to adjust said second waveform-interference waveform;

ML detection means for reproducing said input signal by carrying out a Maximum Likelihood (ML) detection with respect to said adjusted second waveform-interference waveform; and control means for varying coefficients of said first filter, said provisional detector, said second filter and said ML detection means depending on a ratio of a frequency of the input signal and a sampling frequency.

25. A signal reproducing apparatus for reproducing an input signal, comprising:

a first filter for generating from the input signal a first waveform-interference waveform which is subjected to a T-bit convolution;

provisional detection means for generating from said first waveform-interference waveform a second waveform-interference waveform which is subjected to a $(T-\tau)$-bit convolution;

said provisional detection means including a provisional detector for generating said second waveform-interference waveform from said first waveform-interference waveform, and a second filter carrying out a weighting with respect to said second waveform-interference waveform generated from said provisional detector;

said provisional detector including a Decision Feedback Equalization (DFE) detector which carries out a provisional detection by calculating an estimated waveform interference quantity from a preceding waveform-interference waveform, obtaining a subtraction result by subtracting said estimated waveform interference waveform, and making a binary value judgment with respect to said subtraction result;

a subtracter for subtracting said second waveform-interference waveform from said first waveform-interference waveform so as to generate a $\tau$-bit third waveform-interference waveform; and ML detection means for reproducing the input signal by carrying out a Maximum Likelihood (ML) detection with respect to said third waveform-interference waveform.

26. The signal reproducing apparatus as claimed in claim 25, further comprising control means for varying coefficients of said first filter, said provisional detector, said second filter and said ML detection means depending on a ratio of a frequency of the input signal and a sampling frequency.

27. A signal reproducing apparatus for reproducing an input signal, comprising:

a first filter for generating from the input signal a first waveform-interference waveform which is subjected to a T-bit convolution;

provisional detection means for generating from said first waveform-interference waveform a second waveform-interference waveform which is subjected to a $(T-\tau)$-bit convolution;

said provisional detection means including a provisional detector for generating said second waveform-interference waveform from said first waveform-interference waveform, and a second filter carrying out a weighting with respect to said second waveform-interference waveform generated from said provisional detector;

a subtracter for subtracting said second waveform-interference waveform from said first waveform-interference waveform so as to generate a $\tau$-bit third waveform-interference waveform;

ML detection means for reproducing the input signal by carrying out a Maximum Likelihood (ML) detection with respect to said third waveform-interference waveform; and control means for varying coefficients of said first filter, said provisional detector, said second filter and said ML detection means depending on a ratio of a frequency of the input signal and a sampling frequency.

* * * * *

UNITED STATES PATENT AND TRADEMARK OFFICE
CERTIFICATE OF CORRECTION

PATENT NO. : 5,995,545
DATED : November 30, 1999
INVENTOR(S) : Ueno

It is certified that error appears in the above-indentified patent and that said Letters Patent is hereby corrected as shown below:

In Claim 4, line 14, please delete "at" and insert --a-- therefor.

In Claim 16, line 12, please delete "(T-τ- bit" and insert -- (T-τ)-bit -- therefor.

Signed and Sealed this

Third Day of April, 2001

Attest:

NICHOLAS P. GODICI

Attesting Officer    Acting Director of the United States Patent and Trademark Office